(12) United States Patent
Shibata et al.

(10) Patent No.: US 8,562,482 B2
(45) Date of Patent: Oct. 22, 2013

(54) CONTROL DEVICE FOR VEHICULAR DRIVE SYSTEM

(75) Inventors: Hiroyuki Shibata, Susono (JP); Tooru Matsubara, Toyota (JP); Atsushi Tabata, Okazaki (JP); Koichiro Muta, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 39 days.

(21) Appl. No.: 13/307,425

(22) Filed: Nov. 30, 2011

(65) Prior Publication Data
US 2012/0077639 A1   Mar. 29, 2012

Related U.S. Application Data

(62) Division of application No. 12/003,450, filed on Dec. 26, 2007, now Pat. No. 8,152,667.

(30) Foreign Application Priority Data

Dec. 30, 2006   (JP) .................................. 2006-356943

(51) Int. Cl.
    *B60W 10/06*   (2006.01)
(52) U.S. Cl.
    USPC .................. 477/3; 477/20; 475/5; 180/65.28; 701/101; 701/110
(58) Field of Classification Search
    USPC ......... 180/65.28; 477/3, 15, 20; 701/101, 110
    See application file for complete search history.

(56) References Cited

U.S. PATENT DOCUMENTS

| | | | |
|---|---|---|---|
| 5,887,670 A * | 3/1999 | Tabata et al. ............... | 180/65.25 |
| 5,954,608 A * | 9/1999 | Kirkwood et al. ............ | 475/147 |
| 6,019,699 A * | 2/2000 | Hoshiya et al. ................. | 477/20 |
| 6,110,069 A * | 8/2000 | Taniguchi et al. ............ | 475/330 |
| 6,344,008 B1 * | 2/2002 | Nagano et al. .................... | 475/1 |
| 6,494,801 B1 * | 12/2002 | Ohtake et al. ..................... | 475/5 |

(Continued)

FOREIGN PATENT DOCUMENTS

| | | |
|---|---|---|
| EP | 1 225 110 A1 | 7/2002 |
| EP | 1 701 061 A1 | 9/2006 |

(Continued)

OTHER PUBLICATIONS

Jul. 12, 2011 Office Action issued in JP Application No. 2006-356943.

(Continued)

*Primary Examiner* — J. Allen Shriver, II
*Assistant Examiner* — Erez Gurari
(74) *Attorney, Agent, or Firm* — Oliff & Berridge, PLC

(57) ABSTRACT

A control device for a vehicular drive system is disclosed as including reverse drive for suppression means operative to preclude output member, such as an output shaft and drive wheels, of an automatic transmission portion from inputting a reverse drive force to a differential portion. This prevents a power transmitting member from rotating in a direction opposite to a rotational direction of the same with a running position being set. This suppresses a first electric-motor rotation speed, determined with an engine rotation speed and a power transmitting member rotation speed based on the relationship on mutually relative rotation speeds in the differential portion, from increasing to a high level. This results in improved durability of a first electric-motor.

2 Claims, 16 Drawing Sheets

(56) References Cited

U.S. PATENT DOCUMENTS

| | | | |
|---|---|---|---|
| 6,549,839 B2 * | 4/2003 | Katakura et al. | 701/54 |
| 6,802,792 B2 * | 10/2004 | Fujimine et al. | 475/116 |
| 7,229,372 B2 * | 6/2007 | Shimanaka et al. | 474/28 |
| 7,235,029 B2 * | 6/2007 | Klemen et al. | 475/5 |
| 7,255,664 B2 * | 8/2007 | Ohta | 477/175 |
| 7,309,067 B2 * | 12/2007 | Kita | 475/210 |
| 7,318,787 B2 * | 1/2008 | Tabata et al. | 477/3 |
| 7,324,885 B2 * | 1/2008 | Sah et al. | 701/58 |
| 7,389,168 B2 * | 6/2008 | Imazu et al. | 701/54 |
| 7,396,306 B2 * | 7/2008 | Long et al. | 475/127 |
| 7,496,435 B2 * | 2/2009 | Iwatsuki et al. | 701/22 |
| 7,510,504 B2 * | 3/2009 | Cullen et al. | 477/107 |
| 7,537,542 B2 * | 5/2009 | Cawthorne et al. | 477/3 |
| 7,582,039 B2 * | 9/2009 | Iwasaki et al. | 475/280 |
| 7,771,309 B2 * | 8/2010 | Kamada et al. | 477/3 |
| 7,908,063 B2 * | 3/2011 | Sah | 701/51 |
| 7,909,728 B2 * | 3/2011 | Tabata et al. | 477/3 |
| 7,922,617 B2 * | 4/2011 | Matsubara et al. | 477/3 |
| 7,927,244 B2 * | 4/2011 | Iwanaka et al. | 475/5 |
| 7,955,215 B2 * | 6/2011 | Shibata | 477/3 |
| 8,192,325 B2 * | 6/2012 | Matsubara et al. | 477/20 |
| 2003/0097215 A1 * | 5/2003 | Riedle et al. | 701/110 |
| 2003/0100395 A1 * | 5/2003 | Hiraiwa | 475/5 |
| 2003/0193264 A1 * | 10/2003 | Pyntikov et al. | 310/254 |
| 2006/0142107 A1 * | 6/2006 | Kobayashi et al. | 475/116 |
| 2006/0166773 A1 * | 7/2006 | Raghavan et al. | 475/5 |
| 2007/0032327 A1 * | 2/2007 | Raghavan et al. | 475/5 |
| 2007/0111854 A1 * | 5/2007 | Tabata et al. | 477/110 |
| 2007/0129196 A1 * | 6/2007 | Bucknor et al. | 475/5 |
| 2007/0129204 A1 * | 6/2007 | Bucknor et al. | 475/275 |
| 2007/0155581 A1 * | 7/2007 | Tabata et al. | 477/3 |
| 2007/0197335 A1 * | 8/2007 | Raghavan et al. | 475/5 |
| 2007/0213159 A1 * | 9/2007 | Bucknor et al. | 475/5 |
| 2007/0275806 A1 * | 11/2007 | Raghavan et al. | 475/5 |
| 2007/0275807 A1 * | 11/2007 | Bucknor et al. | 475/5 |
| 2007/0298923 A1 * | 12/2007 | Raghavan | 475/5 |
| 2008/0182710 A1 * | 7/2008 | Shibata et al. | 477/3 |
| 2009/0062068 A1 * | 3/2009 | Nakai et al. | 477/92 |
| 2009/0062070 A1 * | 3/2009 | Tabata et al. | 477/109 |
| 2009/0075779 A1 * | 3/2009 | Kumazaki et al. | 477/3 |
| 2009/0156349 A1 * | 6/2009 | Yang | 475/218 |
| 2012/0077639 A1 * | 3/2012 | Shibata et al. | 477/20 |

FOREIGN PATENT DOCUMENTS

| | | |
|---|---|---|
| JP | U 03-032252 | 3/1991 |
| JP | A 09-020161 | 1/1997 |
| JP | A 10-016745 | 1/1998 |
| JP | A-10-290502 | 10/1998 |
| JP | A 2000-008903 | 1/2000 |
| JP | A 2001-235015 | 8/2001 |
| JP | A 2002-264784 | 9/2002 |
| JP | A-2003-061205 | 2/2003 |
| JP | A 2004-150507 | 5/2004 |
| JP | A 2005-176429 | 6/2005 |
| JP | A 2005-264762 | 9/2005 |
| JP | A 2005-337372 | 12/2005 |
| JP | A 2006-029439 | 2/2006 |
| JP | A 2006-044348 | 2/2006 |

OTHER PUBLICATIONS

Apr. 17, 2008 Search Report issued in GB Application No. 0725305.7.

* cited by examiner

|  | C1 | C2 | B1 | B2 | B3 | F1 | SHIFTING RATIO | STEP |
|---|---|---|---|---|---|---|---|---|
| 1st | ○ |  |  |  | ◎ | ○ | 3.357 | 1.54 |
| 2nd | ○ |  |  | ○ |  |  | 2.180 | 1.53 |
| 3rd | ○ |  | ○ |  |  |  | 1.424 | 1.42 |
| 4th | ○ | ○ |  |  |  |  | 1.000 | TOTAL |
| R |  | ○ |  |  | ○ |  | 3.209 | 3.36 |
| N |  |  |  |  |  |  |  |  |

○ ENGAGED   ◎ ENGAGED UPON REGENERATION

CONTROL DEVICE FOR VEHICULAR DRIVE SYSTEM

This is a Division of application Ser. No. 12/003,450 filed Dec. 26, 2007, which claims the benefit of Japanese Patent Application No. 2006-356943 filed Dec. 30, 2006. The disclosure of the prior applications are hereby incorporated by reference herein in their entirety.

BACKGROUND OF THE INVENTION

1. Field of the Invention

This invention relates to a control device for a vehicular drive system having an electric differential portion, incorporating a differential mechanism for distributing an engine output to a first electric-motor and a power transmitting member, and a transmission portion disposed in a power transmitting path between the electric differential portion and drive wheels. More particularly, it relates to the control device including addressing means to address an issue arising from a case where a drive force is input from output member of the transmission portion in a rotation direction opposite to that in which the output member rotate under a running position.

2. Description of the Related Art

There has heretofore been known a control device for a vehicular drive system which includes an electric differential portion, comprised of a first element connected to an engine, a second element connected to a first electric-motor and a third element connected to a power transmitting member for distributing an engine output to a first electric-motor and a power transmitting member, and a transmission portion i.e., shifting portion disposed in a power transmitting path between the power transmitting member and drive wheels.

For instance, such a control device for the vehicular drive system is disclosed in Patent Publication 1 (Japanese Patent Application Publication No. 2005-264762A1). With the control device for the vehicular drive system, the differential mechanism includes a planetary gear set and the transmission portion includes a step variable automatic transmission portion. An overall drive system establishes an overall speed ratio (total speed ratio) with a speed ratio of the electric differential portion enabled to function as a continuously variable transmission and a speed ratio corresponding to various gear positions (gear shift positions) of the transmission portion. In addition, Patent Publication 1 discloses a shift a shift operation device that can be set to a forward drive running position for performing a forward drive as a running position, in which a power transmitting path between the power transmitting member and the drive wheels is placed in a power transmitting state, and a reverse drive running position for a reverse drive running mode.

Other techniques disclosed in Patent Publication 2 (Japanese Patent Application Publication No. 2005-337372 A1), Patent Publication 3 (Japanese Patent Application Publication No. 2006-44348A1), Patent Publication 4 (Japanese Patent Application Publication No. 2004-150507A1), Patent Publication 5 (Japanese Patent Application Publication No. 2005-176429A1), Patent Publication 6 (Japanese Patent Application Publication No. 2000-8903A1), and Patent Publication 7 (Japanese Patent Application Publication No. 2006-29439A1), Patent Publication 8 (Japanese Patent Application Publication No. 3-32252A1), Patent Publication 9 (Japanese Patent Application Publication No. 9-20161A1), Patent Publication 10 (Japanese Patent Application Publication No. 10-16745A1), Patent Publication 11 (Japanese Patent Application Publication No. 2002-264784A1), and Patent Publication 12 (Japanese Patent Application Publication No. 2001-235015A1) have been known.

With the control device for the vehicular drive system mentioned above, a shift operation device is sometimes set to the running position to allow the power transmitting path between the power transmitting member and drive wheels to be placed in the power transmitting state. When this takes place, a rotation speed of the power transmitting member, i.e., an input rotation speed of the transmission portion, representing an output rotation speed of the electric differential portion, is bound with an output rotation speed relevant value of the vehicular drive system such as rotation speeds of output member of the transmission portion such as, for instance, an output rotation speed of the transmission portion or a vehicle speed, etc.

Here, let's consider about a case wherein, for instance, the shift operation device selects a forward-drive running position under which the vehicle goes back on a slope or the like. In this case, if the drive wheels rotates in a direction opposite to the rotational direction in the forward-drive running position, the power transmitting member is also caused to rotate in an opposite direction. Then, due to the relationship on mutually relative rotation speeds among the rotation speed of the power transmitting member of the electric differential portion, an engine rotation speed and a rotation speed of the first electric-motor, the rotation speed of the first electric-motor increases to a high level. This depends on the engine rotation speed and rotation speed of the power transmitting member, resulting in a likelihood of an adverse affect arising in durability of the first electric-motor.

FIG. 20 is a well-known collinear chart showing the rotation speeds of various rotary elements forming the electric differential portion. In the collinear chart, examples of rotational states of the various rotary elements are plotted for a phase in which a rotational direction of the drive wheels remains in the same direction of the same appearing when a shift position is set to the running position, and another phase in which the rotational direction of the drive wheels becomes opposite to the rotational direction of the same with the shift position set to the running position. In FIG. 20, reference "ENG" represents a rotation speed of a first rotary element (first element) connected to an engine; "M1" a rotation speed of a second rotary element (second element) connected to the first electric-motor; and "M3" a rotation speed of a third rotary element (third element) connected to the power transmitting member.

Respective straight lines represent correlations on the rotation speeds of the various rotary elements. A solid line "a" represents a correlation in which the vehicle goes forward with the shift position being set to a forward-drive running position ("D" position) and the vehicle goes back with the shift position being set to a reverse-drive running position ("R" position). A broken line "b" represents a correlation for the reverse drive (in reverse rotation) of the vehicle under the "D" position and the forward drive (in reverse rotation) of the vehicle under the "R" position.

As shown by the broken line "b", if the rotational direction of the drive wheels becomes opposite to the rotational direction of the same under the running position, the rotational direction of the power transmitting member takes a negative rotation speed. This causes the rotation speed of the first electric-motor to be liable to increase at a high level in contrast to a phase in which the rotational direction of the drive wheels lies in the same direction under the running position as shown by the solid line "a".

SUMMARY OF THE INVENTION

The present invention has been completed with the above views in mind and has an object to provide a control device for a vehicular drive system that can suppress the occurrence of a high-speed rotation of a first electric-motor, even when a rotational direction of drive wheels becomes opposite to that of the same in a running position.

For achieving the above object, the invention is featured by a control device for a vehicular drive system, (i) the vehicular drive system including: an electric differential portion having a first element connected to an engine, a second element connected to a first electric-motor and a third element connected to a power transmitting member for distributing an output of the engine to the first electric-motor and the power transmitting member; a transmission portion disposed in a power transmitting path between the power transmitting member and drive wheels; and a shift operation device having a running position as a settable shift position to place the power transmitting path in a power transmitting state; and (ii) the control device being characterized by: reverse drive force suppression means for preventing an output member of the transmission portion from inputting a reverse drive force to the electric differential portion, when a rotational direction of the drive wheels becomes opposite to the rotational direction in the running position set by the shift operation device.

With such a structure, if the rotational direction of the drive wheels becomes opposite to that of the same under the running position set by the shift operation device, the reverse drive force suppression means prevents the output member of the transmission portion from inputting a reverse drive force to the electric differential portion. This prevents the power transmitting member from rotating in a direction opposite to that of the same with the shift position being set to the running position. This prevents an increase in the rotation speed of the first electric-motor. The high-speed rotation of the first electric-motor is determined based on the engine rotation speed and rotation speed of the power transmitting member by referring to the relationship on the mutually relative rotation speeds of the rotary elements of the electric differential portion. Thus, the first electric-motor can have improved durability.

The reverse drive force suppression means includes rotation stop means for stopping the rotation of the output member of the transmission portion. With such a structure, the power transmitting member is prevented from being rotatably driven in a direction opposite to that of the same with the shift position being set to the running position. This properly prevents the high-speed rotation of the first electric-motor.

The rotation stop means blocks the rotations of rotary elements forming the transmission portion. With such a structure, the output member of the transmission portion can be properly stopped in rotation.

The transmission portion is an automatic transmission portion in which a plurality of coupling devices including a one-way clutch are operative to be coupled or uncoupled for switching to alternatively establish a plurality of gear positions; and the rotation stop means is operative to shift the gear positions of the automatic transmission portion to a gear position for the one-way clutch to be coupled. With such a structure, the rotary elements forming the transmission portion can be properly blocked in rotation.

The rotation stop means is operative to actuate a wheel brake device of a vehicle. With such a structure, the output member of the transmission portion can be properly stopped in rotation.

The reverse drive force suppression means has rotation interruption means for interrupting a rotation transfer from output member of the transmission portion. Such a structure precludes the power transmitting member from being rotatably driven in a direction opposite to that of the same with the shift position being set to the running position. This properly prevents the occurrence of the high-speed rotation of the first electric-motor.

The transmission portion is an automatic transmission portion including a plurality of clutch devices operative to be coupled or uncoupled for switching to alternatively establish a plurality of gear positions; and the rotation interruption means is operative to uncouple the coupling devices so as to interrupt a power transmitting path in the automatic transmission portion. With such a structure, the output member of the transmission portion can be properly stopped in rotation.

The coupling devices are hydraulically operated coupling devices; and the rotation interruption means is operative to interrupt supply of hydraulic pressure to the hydraulically operated coupling devices. With such a structure, the coupling device can be uncoupled so as to properly interrupt the power transmitting path in the automatic transmission portion.

The rotation interruption means is operative to stop operation of a hydraulic pressure source for thereby interrupting the supply of hydraulic pressure to the hydraulically operated coupling devices. Such a structure properly enables the interruption of the supply of hydraulic pressure to the hydraulically operated coupling device.

The rotation interruption means stops the operation of the hydraulic pressure source, when a hydraulic pressure control circuit for controlling hydraulic pressure supplied to the hydraulically operated coupling devices is disenabled to interrupt the supply of hydraulic pressure to the hydraulically operated coupling devices. Such a structure interrupts the supply of hydraulic pressure to the hydraulically operated coupling device in a reliable manner.

The reverse drive force suppression means is operative to prevent the output member of the transmission portion from inputting a reverse drive force to the electric differential portion, when an output rotation speed relevant value of the vehicular drive system exceeds a given rotation speed. Such a structure enables the execution of the control for minimizing the reverse drive force, input from the output member of the transmission portion to the electric differential portion, to be suppressed beyond necessity.

The given rotation speed is altered depending on a speed ratio of the transmission portion. Such a structure alters an ease of performing the control of preventing the reverse drive force from being input form the output member of the transmission portion to the electric differential portion depending on a phase in which a reverse rotation of the power transmitting member increases in speed with an increase in a speed ratio of the transmission portion to cause the rotation speed of the first electric-motor to increase.

The given rotation speed is altered such that the greater the speed ratio of the transmission portion, the lower will be the given rotation speed. With such a structure, the control of preventing the reverse drive force from being input form the output member of the transmission portion to the electric differential portion can be easily performed as the speed ratio of the transmission portion increases with a resultant increase in the rotation speed of the first electric-motor.

The given rotation speed is altered depending on an engine rotation speed. With such a structure, an ease of performing the control of preventing the output member of the transmission portion from inputting the reverse drive force to the electric differential portion can be altered according to the occurrence of an increase in the engine rotation speed even at the same vehicle speed caused by an increase of the rotation speed of the first electric-motor due to the reverse rotation of the power transmitting member.

The invention is featured by engine rotation speed prediction means for predicting an achievable engine rotation speed when the engine rotation speed is limited; wherein the given rotation speed is altered depending on the engine rotation speed predicted by the engine rotation speed prediction means.

With such a structure, an ease of performing the control of preventing the output member of the transmission portion from inputting the reverse drive force to the electric differential portion can be altered according to an achievable predicted engine rotation speed in addition of a tinge of a response occurring when dropping the engine rotation speed toward a target for the purpose of suppressing the high-speed rotation of, for instance, the first electric-motor.

The transmission portion is an automatic transmission portion having a plurality of coupling devices operative to be coupled or uncoupled for switching to alternatively establish a plurality of gear positions; the shift operation device further has a non-running position as a settable shift position for interrupting a power transmitting path of the automatic transmission portion; and the engine rotation speed prediction means is operative, when the engine rotation speed is limited originating from a time at which the shift operation device is switched from the non-running position to the running position, so as to predict the engine rotation speed achievable at a time when the power transmitting path of the automatic transmission portion is placed in a power transmitting state by coupling commencement of the coupling device resulted from switching of the shifting position.

With such an operation, the given rotation speed can be properly altered based on the predicted engine rotation speed when the reverse rotation of the power transmitting member actually takes place.

The given rotation speed is altered such that the higher the engine rotation speed, the lower will be the given rotation speed. With such an operation, as the engine rotation speed increases with a resultant increase in the rotation speed of the first electric-motor, the control of preventing the output member of the transmission portion from inputting the reverse drive force to the electric differential portion can be easily performed.

The invention is featured by a control device for a vehicular drive system, (i) the vehicular drive system including an electric differential portion having a first element connected to an engine, a second element connected to a first electric-motor and a third element connected to a power transmitting member for distributing an output of the engine to the first electric-motor and the power transmitting member, and a transmission portion disposed in a power transmitting path between the power transmitting member and drive wheels; and (ii) the control device comprising engine rotation speed limitation means for limiting an engine rotation speed when a speed ratio of the transmission portion is high in contrast to case where the speed ratio of the transmission portion is low.

With such a structure, the engine rotation speed limitation means limits the engine rotation speed when the transmission portion has a large speed ratio in contrast to a case where the speed ratio is small. Therefore, even if the rotational direction of the drive wheels becomes opposite to the rotational direction of the same with the shift position set to the running position, the first electric-motor can be prevented from rotating at a high speed due to the power transmitting member involved in the reverse rotation that increases with an increase in the speed ratio of the transmission portion.

The transmission portion has a subsidiary transmission provided with switchable gear positions in large and small two stages; and the engine rotation speed limitation means limits the engine rotation speed when the subsidiary transmission is shifted to a gear position with a high speed ratio in contrast to case where the subsidiary transmission is shifted to another gear position with a low speed ratio. Such an operation properly enables the suppression of an increase in the rotation speed of the first electric-motor.

The electric differential device is operative to serve as a continuously variable transmission with an operating state of the first electric-motor being controlled. With such an operation, the electric differential portion and transmission portion constitute a continuously variable transmission, making it possible to smoothly vary drive torque. In addition, the electric differential portion has a function, in addition to the function of continuously vary the speed ratio to act as an electrically controlled continuously variable transmission, to vary the speed ratio stepwise to act as a step variable transmission.

Preferably, the differential mechanism is comprised of the planetary gear set having the first element connected to the engine, the second element connected to the first electric-motor and the third element connected to the power transmitting member. The first element is a carrier of the planetary gear set, the second element a sun gear of the planetary gear set, and the third element a ring gear of the planetary gear set. With such a structure, the differential mechanism is minimized in an axial direction and formed in a simplified structure with the use of one planetary gear set.

Preferably, the planetary gear set is of a single-pinion type planetary gear set. With such a structure, the differential mechanism is minimized in the axial direction and formed in a simplified structure with the use of one single pinion type planetary gear set.

Preferably, the vehicular drive system establishes an overall speed ratio based on a speed ratio of the electric differential portion. This results in a capability of utilizing the speed ratio of the transmission portion for thereby obtaining a drive force in a wide range.

The transmission portion is preferably comprised of the step variable transmission. This enables the electric differential portion, operative to function as, for instance, the electrically controlled continuously variable transmission, and the step variable automatic transmission portion to form the continuously variable transmission. Thus, drive torque can be smoothly varied. In addition, with the electric differential portion placed in a controlled state so as to have a fixed speed ratio, the electric differential portion and the step variable automatic transmission portion can establish the same state as that of the step variable transmission. As a result, the overall speed ratio of the vehicular drive system can be varied step-by-step, making it possible to rapidly obtain drive torque.

Preferably, as used herein, the term "output rotation speed relevant value of the vehicular drive system" refers to a relevant value (equivalent value) corresponding to the vehicle speed, indicating a speed of the vehicle, under the relationship of 1:1 and, to this end, use is made of, in addition to the vehicle speed, an output rotation speed of, for instance, the transmission portion, a rotation speed of a vehicle axle, a rotation speed of a propeller shaft and an output rotation speed of a differential gear device.

DETAILED DESCRIPTION OF THE PREFERRED EMBODIMENTS

Now, various embodiments according to the present invention will be described below in detail with reference to the accompanying drawings.

First Embodiment

Figures 1, 2:
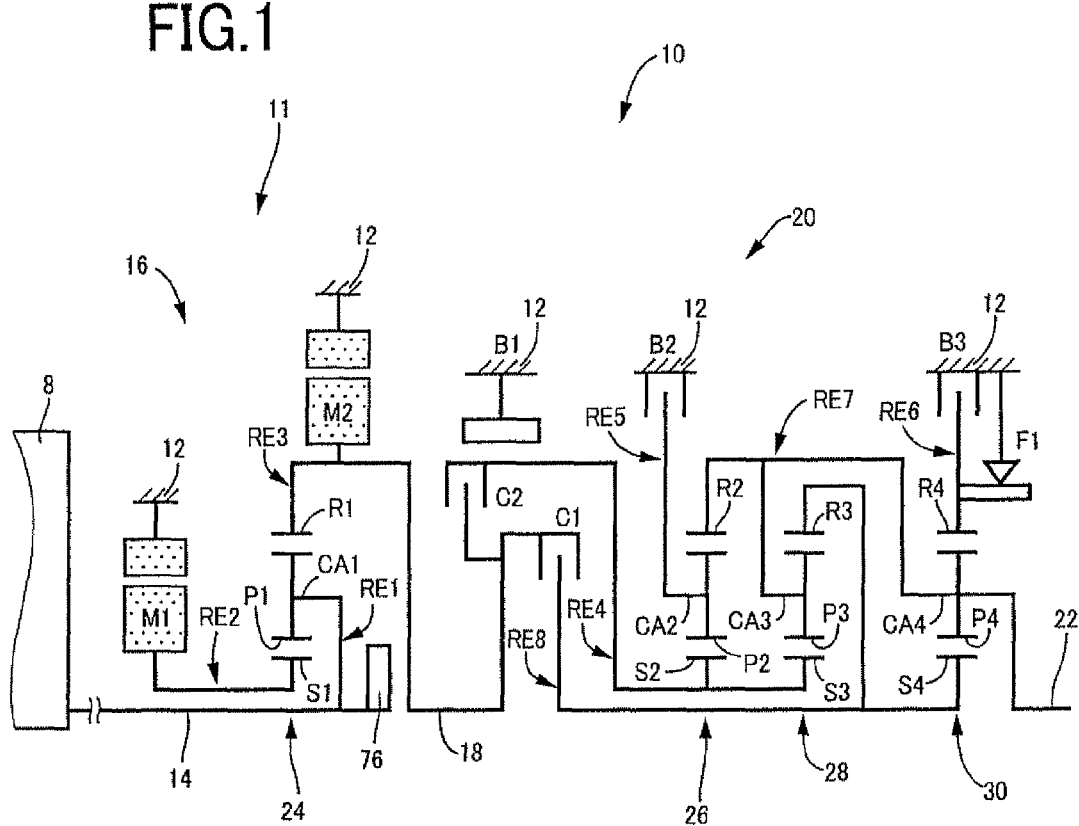
FIG. 1 is a skeleton diagram showing a structure of a vehicular drive system of one embodiment according to the present invention for use in a hybrid vehicle.
FIG. 2 is an operation engagement diagram illustrating a combination of operations of hydraulically operated frictional coupling devices for use in performing shifting operations in the vehicular drive system shown in FIG. 1.

FIG. 1 is a skeleton diagram for illustrating a transmission mechanism i.e., shifting mechanism 10 constituting a part of a drive system for a hybrid vehicle to which the present invention is applied. As shown in FIG. 1, the transmission mechanism 10 includes a transmission case 12 (hereinafter referred to as "a case 12") mounted on a vehicle body as a non-rotary member, an input shaft 14 coaxially disposed inside the case 12 as an input rotary member, an electrically controlled differential portion 11 (hereinafter referred to as a "differential portion 11") coaxially connected to the input shaft 14 either directly, or indirectly via a pulsation absorbing damper (vibration damping device) not shown, and serving as a continuously variable transmission portion, an automatic transmission portion i.e., shifting portion 20 connected in series in a power transmitting path between the differential portion 11 and drive wheels 34 (see FIG. 7) through a power transmitting member 18 (power transmitting shaft), and an output shaft 22 connected to the automatic transmission portion 20 and serving as an output rotary member.

The transmission mechanism 10 may be preferably applied to, for instance, an FR (front-engine and reverse-drive) type vehicle and disposed between an engine 8 and a pair of drive wheels 34. The engine 8 includes an internal combustion engine such as a gasoline engine or a diesel engine or the like and serves as a drive-power source, which is directly connected to the input shaft 12 in series or indirectly through the pulsation absorbing damper (vibration damping device), not shown. This allows a vehicle drive force to be transferred from the engine 8 to the pair of drive wheels 34 in sequence through a differential gear device 32 (final speed reduction gear) (see FIG. 7) and a pair of drive axles.

With the transmission mechanism 10 of the present embodiment, the engine 8 and the differential portion 11 are directly connected to each other. As used herein, the term "directly connected" refers to a structure under which a direct connection is established between the associated component parts in the absence of a fluid-operated power transmitting device, such as a torque converter or fluid coupling device or the like. A connection arrangement including, for instance, the pulsation absorbing damper is involved in the meaning of such a direct connection. Since the transmission mechanism 10 includes upper and lower halves formed in a symmetric relation with each other along a central axis, the lower half is omitted from the skeleton diagram of FIG. 1. This similarly applies to the other embodiments of the invention described below.

The differential portion 11 includes a first electric motor M1, a power distributing mechanism 16 in the form of a mechanical mechanism serving as a differential mechanism through which an engine output applied to the input shaft 14 is mechanically distributed to the first electric motor M1 and the power transmitting member 18, and a second electric motor M2 operatively connected to the power transmitting member 18 for unitary rotation therewith. In the illustrated embodiment, both the first and second electric-motors M1 and M2 are comprised of so-called motor/generators, respectively, each having a function to generate electric power. The first electric motor M1 has at least a function to act as a generator (to generate electric power) for generating a reaction force. The second electric motor M2 has at least a function as a motor (electric motor) to act as a running drive-power source to output a vehicle drive force.

The power distributing mechanism 16 is mainly comprised of a first single-pinion type planetary gear set 24 having a given gear ratio ρρ1 in the order of, for instance, approximately "0.418". The first single-pinion type planetary gear set 24 includes rotary elements (hereinafter referred to as "elements") such as a sun gear S1, first planet gears P1, a first carrier CA1 rotatably supporting the planetary gears such that each of the first planet gears P1 is rotatable about its axis while performing an orbital motion, and a first ring gear R1 in meshing engagement with the first sun gear S1 via the first planet gears P1. Assume that the first sun gear S1 has a gear teeth of ZS1 and the first ring gear R1 has a gear teeth of ZR1, the gear ratio ρ1 is expressed as ZS1/ZR1.

With the power distributing mechanism 16, the first carrier CA1 is connected to the input shaft 14, i.e., the engine 8, the first sun gear S1 connected to the first electric motor M1, and the first ring gear R1 connected to the power transmitting member 18. With the power distributing mechanism 16 of such a structure, the first planetary gear set 24 has the three elements, i.e., the first sun gear S1, the first planetary gear P1, the first carrier CA1 and the first ring gear R1 arranged to rotate relative to each other to be operative for initiating a differential action, that is, in a differential state under which the differential action is initiated. This allows the output of the engine 8 to be distributed to the first electric motor M1 and the power transmitting mechanism 18. Then, a part of the distributed engine output drives the first electric motor M1 to generate electric energy, which is stored in part in a battery, and used in another part to rotatably drive the second electric motor M2.

Thus, the differential portion 11 (power distributing mechanism 16) is caused to function as an electrically operated differential device such that, for instance, the differential portion 11 is placed in a so-called continuously variable shifting state (electrically established CVT state) to rotate the power transmitting member 18 at a continuously varying rate regardless of the engine 8 operating at a given rotation speed. That is, the differential portion 11 functions as an electrically controlled continuously variable transmission to provide a speed ratio γ0 (representing rotation speed $N_{IN}$ of the input shaft 14/rotation speed $N_{18}$ of the power transmitting member 18) that is continuously variable from a minimal value γ0 min to a maximal value γ0 max.

The automatic transmission portion 20, structured of a single-pinion type second planetary gear set 26, a single-pinion type third planetary gear set 28 and a single-pinion type fourth planetary gear set 30, is of a planetary gear type multiple-step transmission operative as a step-variable automatic transmission portion. The second planetary gear set 26 has a second sun gear S2, second planet gears P2, a second carrier CA2 supporting the second planetary gear P2 such that each of the second planet gears P2 is rotatable about its axis and about the axis of the second sun gear S2, and a second ring gear R2 meshing with the second sun gear S2 through the second planet gears P2. For example, the second planetary gear set 26 has a given gear ratio ρ2 of about "0.562". The third planetary gear set 28 has a third sun gear S3, a third planet gears P3, a third carrier CA3 supporting the third planet gears P3 such that each of the third planet gears P3 is rotatable about its axis and about the axis of the third sun gear S3, and a third ring gear R3 meshing with the third sun gear S3 through the third planet gears P3. For example, the third planetary gear set 28 has a given gear ratio ρ3 of about "0.425".

The fourth planetary gear set 30 has a fourth sun gear S4, fourth planet gears P4; a fourth carrier CA4 supporting the fourth planet gears P4 such that each of the fourth planet gear P4 is rotatable about its axis and about the axis of the fourth sun gear S4, and a fourth ring gear R4 meshing with the fourth sun gear S4 through the fourth planet gears P4. For example, the fourth planetary gear set 30 has a given gear ratio ρ4 of, for instance, about "0.421". Suppose the second sun gear S2, second ring gear R2, third sun gear S3, third ring gear R3, fourth sun gear S4 and fourth ring gear R4 have the numbers of gear teeth represented by ZS2, ZR2, ZS3, ZR3, ZS4 and ZR4, respectively, the gear ratios ρ2, ρ3 and ρ4 are expressed by ZS2/ZR2, ZS3/ZR3, and ZS4/ZR4, respectively.

In the automatic transmission portion 20, the second and third sun gears S2, S3 are integrally connected to each other to be selectively connected to the power transmitting member 18 through a second clutch C2 and selectively connected to the casing 12 through a first brake B1. A second carrier CA2 is selectively connected to the casing 12 through a second brake B2 and the fourth ring gear R4 is selectively connected to the casing 12 through a third brake B3. The second ring gear R2, third carrier CA3 and fourth carrier CA4 are integrally connected to each other and connected to the output shaft 22.

The third ring gear R3 and fourth sun gear S4 are integrally connected to each other and selectively connected to the power transmitting member 18 through the first clutch C1. In addition, a one-way clutch F1 is disposed in parallel to the third brake B3 between the fourth ring gear R4 and case 12 for permitting the fourth ring gear R4 to rotate in a normal direction (in the same direction in which the input shaft 14 rotate) while preventing a reverse rotation of the same.

Thus, the inside component parts of the automatic transmission portion 20 and the differential portion 11 (power transmitting member 18) are selectively connected to each other through the first clutch C1 or second clutch C2 which is used for establishing each gear position (shift gear position) of the automatic transmission portion 20. In other words, the first and second clutches C1, C2 function as coupling devices i.e., engaging devices operative to place the power transmitting path between the power transmitting member 18 and automatic transmission portion 20, that is, between the differential portion 11 (power transmitting member 18) and drive wheels 34, selectively in one of a power transmitting state in which the vehicle drive force can be transmitted therethrough, and a power cut-off state in which the vehicle drive force to be transmitted therethrough is interrupted. That is, with at least one of the first and second clutches C1 and C2 brought into coupling engagement, the power transmitting path is placed in the power transmitting state. In contrast, uncoupling both the first and second clutches C1 and C2 allows the power transmitting path to be placed in the power cut-off state.

With the automatic transmission portion 20, further, uncoupling an on-uncoupling side coupling device while coupling an on-coupling side coupling device allows a so-called "clutch-to-clutch" shifting action to be executed for selectively establishing one of the gear positions. This allows a speed ratio γ (representing a ratio of the rotation speed $N_{18}$ of the power transmitting member 18 to the rotation speed $N_{OUT}$ of the output shaft 22) to be obtained in a nearly equal i.e., geometric ratio for each gear position. As indicated in the coupling operation table shown in FIG. 2, for instance, coupling the first clutch C1 and third brake B3 allows a 1st-speed gear position to be established at a speed ratio γ1 of approximately, for instance, "3.357". Coupling the first clutch C1 and second brake B2 allows a 2nd-speed gear position to be established at a speed ratio γ2 of approximately, for instance, "2.180" that is less than a value of the gear ratio of the 1st-speed gear position.

With the first clutch C1 and first brake B1 brought into coupling engagement, a 3rd-speed gear position is established at a speed ratio γ3 of, for instance, approximately "1.424" that is less than a value of the gear ratio of the 2nd-gear position. Coupling the first clutch C1 and second clutch C2 allows a 4th-speed gear position to be established at a speed ratio γ4 of, for instance, approximately "1.000" that is less than a value of the gear ratio of the 3rd-gear position. Further, coupling the second clutch C2 and third brake B3 allows a reverse-drive gear position (reverse-drive shift position) to be established at a speed ratio γ4 of, for instance, approximately "3.209" that is intermediate in value between those of the 1st-speed and 2nd-speed gear positions.

With the first clutch C1, second clutch C2, first brake B1, second brake B2 and third brake B3 being uncoupled, a neutral state "N" is established (However, upon uncoupling the first clutch C1 and second clutch C2, the power transmitting path inside the automatic transmission portion 20 is brought into the power cut-off state. Thus, uncoupling at least the first clutch C1 and second clutch C2 results in a consequence of the neutral state "N"). Especially, further, the one-way clutch F1 is disposed in parallel to the third brake B3. Thus, when establishing the 1st-speed gear position, the third brake B3 is brought into coupling engagement during, for instance, a regenerative operation of the second electric motor M2 or engine brake, and is uncoupled in a drive mode.

The first clutch C1, second clutch C2, first brake B1, second brake B2 and third brake B3 (hereinafter collectively referred to as a "clutch C" and "brake B", unless otherwise specified) are comprised of hydraulically operated frictional coupling devices that are often used in a vehicular automatic transmission portion of the related art. Each of these frictional coupling devices may include a wet-type multiple-disc clutch, having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, each of the frictional coupling devices serves to selectively provide a drive connection between associated two component parts between which such a coupling device is interposed.

With the transmission mechanism 10 of such a structure, the differential portion 11, serving as the continuously variable transmission, and the automatic transmission portion 20 constitute a continuously variable transmission as a whole. Further, controlling the differential portion 11 at a fixed speed ratio enables the differential portion 11 and the automatic transmission portion 20 to provide the same structure as that of a step-variable transmission.

More particularly, the differential portion 11 functions as the continuously variable transmission and the automatic transmission portion 20 connected to the differential portion 11 in series functions as the step-variable transmission, thereby continuously varying a rotation speed (hereinafter referred to as an "input rotation speed of the automatic transmission portion 20"), i.e., a rotation speed of the power transmitting member 18 (hereinafter referred to as a "transmitting-member rotation speed $N_{18}$") input to the automatic transmission portion 20 for at least one gear position "M". This enables the gear position "M" to have a continuously variable range in speed ratio. Accordingly, the transmission mechanism 10 provides an overall i.e., total speed ratio γT (representing a ratio of the rotation speed $N_{IN}$ of the input shaft 14 to the rotation speed $N_{OUT}$ of the output shaft 22) in a continuously variable range. Thus, the transmission mechanism 10 can establish the continuously variable transmission. The overall speed ratio γT of the transmission mechanism 10 is a total speed ratio γT of the automatic transmission portion 20 as a whole that is established depending the speed ratio γ0 of the differential portion 11 and the speed ratio γ of the automatic transmission portion 20.

For the respective gear positions such as, for instance, the 1st-speed to 4th-speed gear positions of the automatic transmission portion 20 and the reverse-drive gear position as indicated in the coupling operation table shown in FIG. 2, the power-transmitting-member rotation speed $N_{18}$ is continuously variable such that each gear position is obtained in a continuously variable speed range. Accordingly, a speed ratio between the adjacent gear positions becomes infinitely and continuously variable, enabling the total speed ratio γT to be obtained in an infinitely variable range with the transmission mechanism 10 as a whole.

Controlling the differential portion 11 at a fixed speed ratio γ0 and selectively coupling the clutch C and brake B causes either one of the 1st-speed to 4th-speed gear positions or the reverse-drive gear position (reverse-drive shift position) to be selectively established. This allows the transmission mechanism 10 to have the overall speed ratio γT in a nearly equal ratio for each of the gear positions. Thus, the transmission mechanism 10 can be established in the same state as that of the step-variable transmission.

If, for instance, the differential portion 11 is controlled so as to establish the speed ratio θ0 at a fixed value of "1", the transmission mechanism 10 provides the total speed ratio γT for each gear position among the 1st-speed to 4th-speed gear positions of the automatic transmission portion 20 and the reverse-drive gear position as indicated by the coupling operation table shown in FIG. 2. Further, if the automatic transmission portion 20 is controlled under the 4th-speed gear position so as to cause the differential portion 11 to have the speed ratio γ0 of approximately, for instance, "0.7" less than a value of "1", the automatic transmission portion 20 has the total speed ratio γT of approximately, for instance, "0.7" that is less than a value of the 4th-speed gear position.

Figure 3:
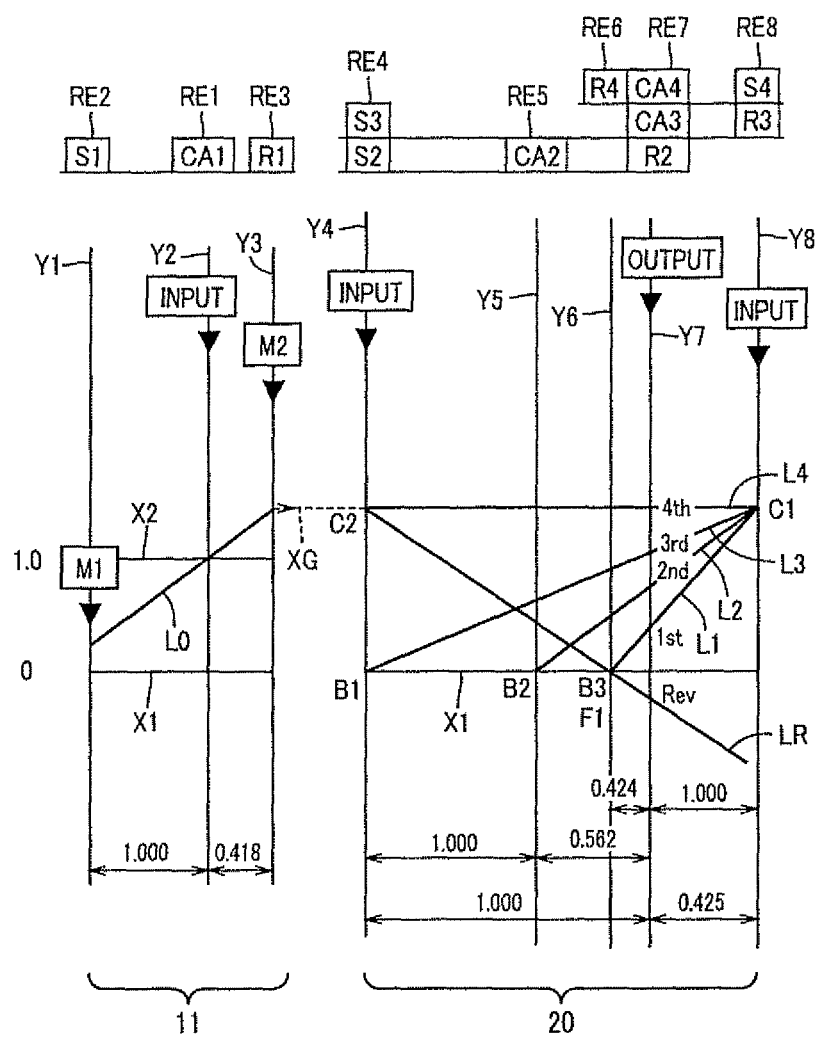
FIG. 3 is a collinear chart indicating relative rotation speeds of rotary elements establishing various gear positions in the vehicular drive system shown in FIG. 1.

FIG. 3 is a collinear chart for the transmission mechanism 10, including the differential portion 11 and the automatic transmission portion 20, wherein the relative motion relationships among the rotation speeds of the various rotary elements in different coupling states for each gear position are plotted on straight lines. The collinear chart of FIG. 3 takes the form of a two-dimensional coordinate system having the abscissa axis plotted with the gear ratios ρ of the planetary gear sets 24, 26, 28 and 30, and the ordinate axis plotted with the relative rotation speeds of the rotary elements. A transverse line X1 indicates the rotation speed that is zeroed; a transverse line X2 the rotation speed of "1.0", that is, the rotating speed $N_E$ of the engine S connected to the input shaft 14; and a transverse line XG the rotation speed of the power transmitting member 18.

Starting from the left in sequence, three vertical lines Y1, Y2 and Y3, corresponding to the three elements of the power distributing mechanism 16 forming the differential portion 11, represent relative rotation speeds of the first sun gear S1 corresponding to the second rotary element (second element) RE2, the first carrier CA1 corresponding to the first rotary element (first element) RE1, and the first ring gear R1 corresponding to the third rotary element (third element) RE3, respectively. A distance between the adjacent vertical lines is decided depending on the gear ratio ρ1 of the first planetary gear set 24.

Starting from the left in sequence, further, five vertical lines Y4, Y5, Y6, Y7 and Y8 for the automatic transmission portion 20 represent the relative rotation speeds of the second and third sun gears S2, S3 connected to each other and corresponding to the fourth rotary element (fourth element) RE4, the second carrier CA2 corresponding to the fifth rotary element (fifth element) RE5, the fourth ring gear R4 corresponding to the sixth rotary element (sixth element) RE6, the second ring gear R2, third carrier CM and fourth carrier CA4 connected to each other and corresponding to the seventh rotary element (seventh element) RE7, and the third ring gear R3 and fourth sun gear S4 connected to each other and corresponding to the eighth rotary element (eighth element) RES, respectively. Each distance between the adjacent vertical lines is decided depending on the gear ratios ρ2, ρ3 and ρ4 of the second, third and fourth planetary gear sets 26, 28 and 30.

In the relationship among the vertical lines on the collinear chart, if a distance between the sun gear and carrier is set to a value corresponding to "1", then, a distance between the carrier and ring gear is set to a value corresponding to the gear ratio ρ of the planetary gear set. That is, for the differential portion 11, a distance between the vertical lines Y1 and Y2 is set to a value corresponding "1" and a distance between the vertical lines Y2 and Y3 is set to a value corresponding to the gear ratio ρ1. For the automatic transmission portion 20, further, a distance between the sun gear and carrier is set to a value corresponding to "1" for each of the second, third and fourth planetary gear sets 26, 28 and 30, for which a distance between the carrier and ring gear is set to a value corresponding to the gear ratio ρ.

Describing the operations in relation to the collinear chart of FIG. 3, the transmission mechanism 10 of the present embodiment has the power distributing mechanism 16 (in the faun of the differential portion 11) arranged in structure to perform the operations as described below. With such a structure, the first rotary element RE1 (first carrier CA1) of the first planetary gear set 24 is connected to the input shaft 14, i.e., the engine 8, and the second rotary element RE2 is connected to the first electric motor M1. The third rotary element RE3 (first ring gear R1) is connected to the power transmitting member 18 and the second electric motor M2. Thus, a rotary motion of the input shaft 14 is transmitted (input) to the automatic transmission portion 20 through the power transmitting member 18. With such a structure, an inclined straight line L0, passing across a point of intersection between the lines Y2 and X2, represents the relationship between the rotation speed of the first sun gear S1 and rotation speed of the first ring gear R1.

For instance, the differential portion 11 is placed in a differential state in which the first to third rotary elements RE1 to RE3 are rendered operative to rotate relative to each other. The rotation speed of the first ring gear R1, indicated at an intersecting point between the straight line L0 and the vertical line Y3 and bound with the vehicle speed V, remains at a nearly fixed level. In such a case, controlling the engine rotation speed $N_E$ causes the rotation speed of the first carrier CA1 to be raised or lowered in a manner as represented by an intersecting point between the straight line L0 and the vertical line Y2. Therefore, the rotation speed of the first sun gear S1, i.e., the rotation speed of the first electric motor M1, is raised or lowered as indicated by an intersecting pint between the straight line L0 and the vertical line Y1.

Controlling the rotation speed. of the first electric motor M1 so as to fix the speed ratio γ0 of the differential portion 11 at a value of "1" allows the first sun gear S1 to rotate at the same speed as the engine rotation speed $N_E$. In this case, the straight line L0 is aligned i.e., coincided with the horizontal line X2. When this takes place, the first ring gear R1, i.e., the power transmitting member 18, is caused to rotate at the same speed as the engine rotation speed $N_E$. On the contrary, if the rotation speed of the first electric motor M1 is controlled so as to fix the speed ratio γ0 of the differential portion 11 at a value of approximately, for instance, "0.7" less than the value of "1", then, the rotation speed of the first sun gear S1 is zeroed. In this moment, the power transmitting member 18 is caused to rotate at the power-transmitting-member rotation speed $N_{18}$ higher than the engine rotation speed $N_E$.

With the automatic transmission portion 20, the fourth rotary element RE4 is selectively connected to the power transmitting member 18 via the second clutch C2 and selectively connected to the casing 12 via the first brake B1. The fifth rotary element RES is selectively connected to the casing 12 via the second brake B2. The sixth rotary element RE6 is selectively connected to the casing 12 via the third brake B3 (or the one-way clutch F1). The seventh rotary element RE7 is connected to the output shaft 22 and the eighth rotary element RES is selectively connected to the power transmitting member 18 via the first clutch C1.

With the automatic transmission portion 20, the differential portion 11 is placed in a state with the straight line L0 aligned with the horizontal line X2. In this case, the differential portion 11 inputs a rotary motion to the eighth rotary element RE8 at the same speed as the engine rotation speed $N_E$. Thus, the first clutch C1 and third brake B3 (or the one-way clutch F1) are coupled as shown in FIG. 3. In this case, the rotation speed of the output shaft 22 for the 1st-speed gear position is represented by an intersecting point between the inclined line L1, passing across an intersecting point between the vertical line Y8 indicative of the rotation speed of the eighth rotary element REB, and the horizontal line X2, and a point of intersection between the vertical line Y6 indicative of the rotation speed of the sixth rotary element RE6, and the horizontal line X1, and an intersecting point intersecting the vertical line Y7 indicative of the rotation speed of the seventh rotary element RE7 connected to the output shaft 22.

Similarly, the rotation speed of the output shaft 22 for the 2nd-speed gear position is represented by an intersecting point between an inclined straight line L2, determined with the first clutch C1 and second brake B2 being coupled, and the vertical line Y7 indicative of the rotation speed of the seventh rotary element RE7 connected to the output shaft 22. The rotation speed of the output shaft 22 for the 3rd-speed gear position is represented by an intersecting point between an inclined straight line L3, determined with the first clutch C1 and first brake B1 being coupled, and the vertical line Y7 indicative of the rotation speed of the seventh rotary element RE7 connected to the output shaft 22. The rotation speed of the output shaft 22 for the 4th-speed gear position is represented by an intersecting point between a horizontal straight line L4, determined with the first clutch C1 and second brake B2 being coupled, and the vertical line Y7 indicative of the rotation speed of the seventh rotary element RE7 connected to the output shaft 22.

Figure 4:
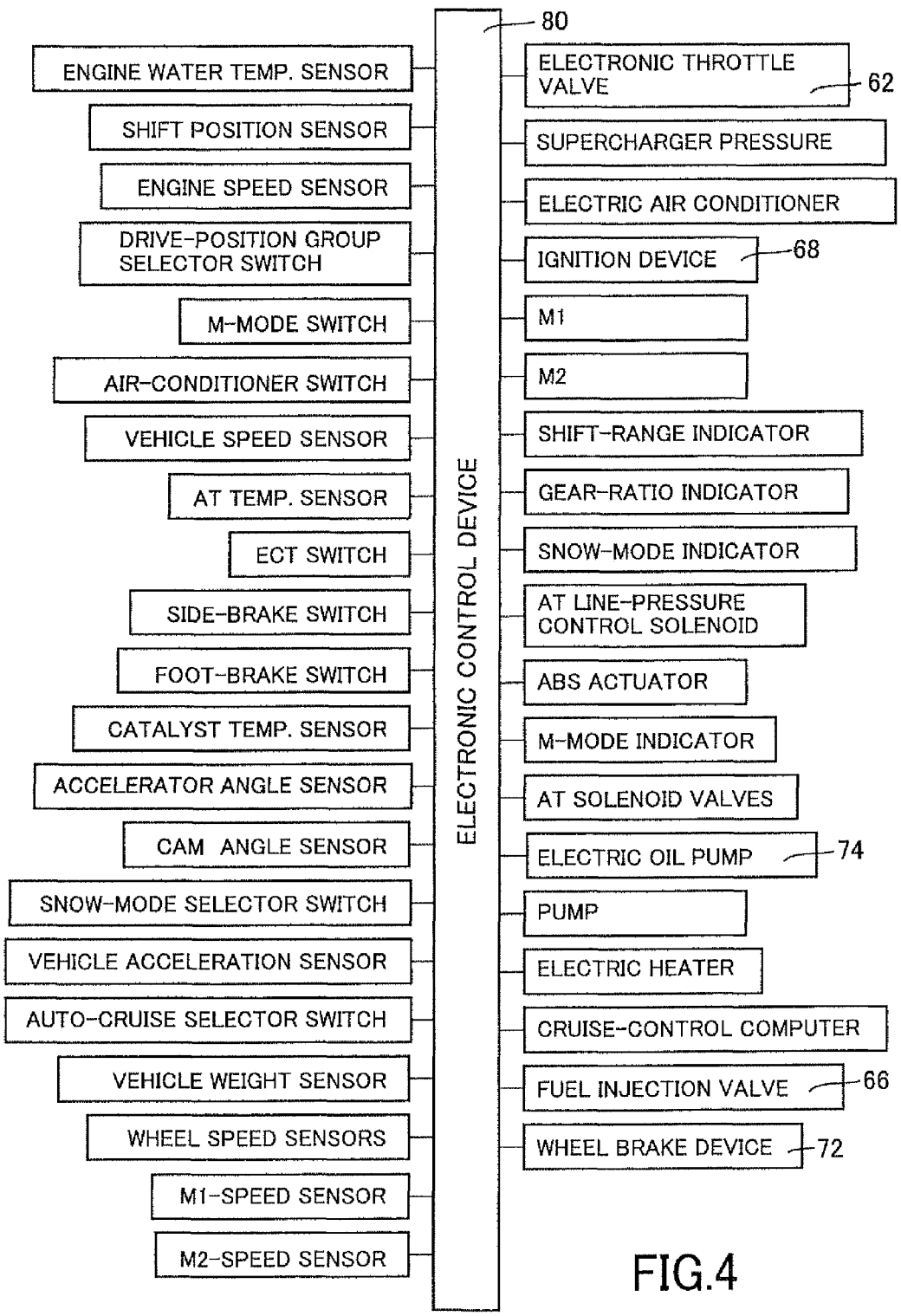
FIG. 4 is a view showing an electronic control unit, associated with input and output signals, which is provided in the vehicular drive system shown in FIG. 1.

FIG. 4 shows an electronic control unit 80 operative to control the transmission mechanism 10 of the present invention in relation to various input signals and various output signals associated therewith, respectively. The electronic control unit 80 includes a so-called microcomputer incorporating a CPU, a ROM, a RAM and an input/output interface. Signal processing is performed according to programs pre-stored in the ROM while utilizing a temporarily stored function of the ROM. This allows hybrid drive controls to be executed for the engine 8 and first and second electric-motors M1 and M2, while permitting the automatic transmission portion 20 to be drivably controlled for executing a shifting control or the like.

The electronic control unit 80 is connected to various sensors and switches as shown in FIG. 4 to receive various signals such as: a signal indicative of an engine coolant temperature $TEMP_W$; a signal representing the number of frequencies of operations initiated on a shift lever 52 (shown in FIG. 7) for a shift position $P_{SH}$ and the "M" position; a signal representing the engine rotation speed $N_E$ indicative of the rotation speed of the engine 8; a signal representing a gear ratio group preset value; a signal commanding an M mode (manual shift running mode) to be initiated; a signal representing an operated state of an air conditioner; a signal representing the vehicle speed V corresponding to the rotation speed (hereinafter referred to as "output-shaft rotation speed") $N_{OUT}$ of the output shaft 22; and a signal representing a working oil temperature $T_o$ of the automatic transmission portion 20.

Figure 7:
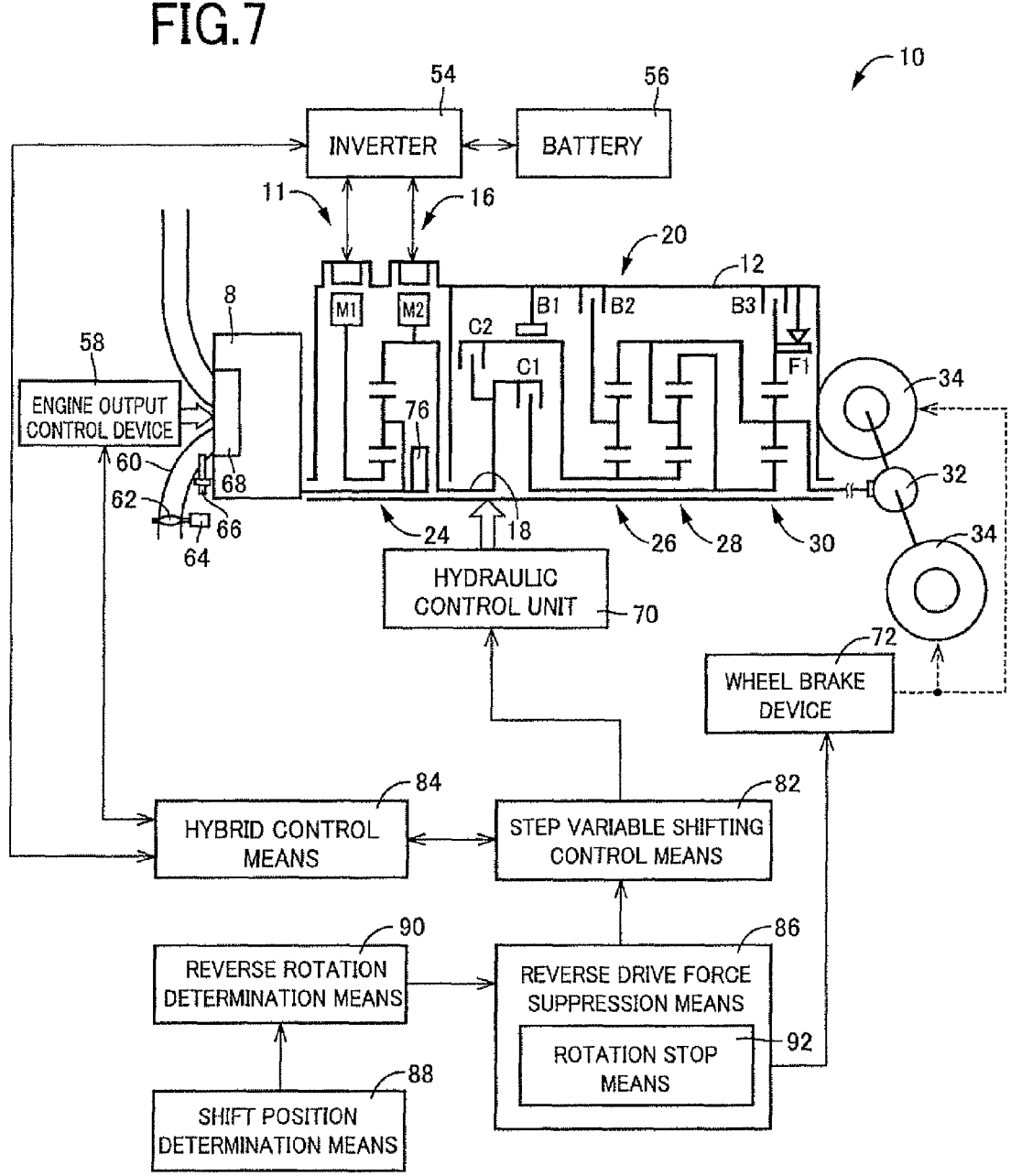
FIG. 7 is a functional block diagram illustrating major control functions to be executed by the electronic control unit of FIG. 4.

The electronic control unit 80 is further supplied with other signals such as: a signal indicative of a foot brake under operation representing the foot brake (wheel brake device), acting as a normal brake, which is placed under operation; a signal indicative of a catalyst temperature; a signal indicative of an accelerator opening Acc representing an operating stroke of an accelerator pedal being manipulated by a driver as an output demand value; a signal indicative of a cam angle; a signal indicative of a snow mode being set; a signal indicative of an acceleration value G in a fore and aft direction of the vehicle; a signal indicative of an auto-cruising drive mode; a signal indicative of a weight (vehicle weight) of the vehicle; a signal indicative of a wheel velocity of each of drive wheels; a signal indicative of a rotation speed $N_{M1}$ of the first electric motor M1 (hereinafter referred to as a "first electric-motor rotation speed $N_{M1}$"); a signal indicative of a rotation speed $N_{M2}$ of the second electric motor M2 (hereinafter referred to as a "second electric-motor rotation speed $N_{M2}$"); and a signal indicative of a state of charge SOC stored in a battery 56 (see FIG. 7).

The electronic control unit 80 generates various output signals such as: control signals applied to an engine output control device 58 (see FIG. 7) for controlling the engine output, i.e., a drive signal applied to a throttle actuator 64 for controlling a throttle valve opening .eta. $_{TH}$ of an electronic throttle valve 62 disposed in an intake manifold 60 of the engine 8, a fuel supply quantity signal applied to a fuel injecting device 66 for controlling an amount of fuel being injected into the intake manifold 60 or cylinders of the engine 8, and an ignition signal applied to an ignition device 68 for commanding an ignition timing of the engine 8; a supercharger pressure regulation signal for regulating a supercharger pressure of the engine 8; an electric air-conditioner drive signal for actuating an electric air conditioner; command signals for commanding the first and second electric-motors M1 and M2 to be operated; a shift position (manipulated position) display signal for actuating a shift-range indicator; a gear-ratio indicating signal for displaying the gear ratio; a snow-mode display signal for displaying the presence of a snow-mode; and an ABS actuation signal for operating an ABS actuator to preclude the drive wheels from slipping during a brake phase.

In addition, the output signals may further include an M-mode display signal for displaying an M-mode being selected; valve command signals for rendering electromagnetic valves (linear solenoid valves), incorporated in the hydraulic control unit 70 (see FIGS. 5 and 7), operative for controlling the hydraulic actuators of the hydraulically operated frictional coupling devices of the differential portion 11 and automatic transmission portion 20; a signal for regulating a regulator valve (pressure regulator valve), incorporated in the hydraulic control unit 70, to regulate a line oil pressure PL; a drive command signal for actuating an electric hydraulic pump 74 acting as a hydraulic original-pressure source for the line oil pressure $P_L$ to be regulated; a signal for driving an electric heater; a signal, applied to a cruise-control computer; and a wheel brake device actuation signal for actuating a wheel brake device 72 in a mode independently of, for instance, a foot brake pedal being artificially manipulated due to a driver's manipulation, etc.

The wheel brake device 72, shown in FIG. 4, is associated with the foot brake pedal being manipulated to supply a brake oil pressure to wheel cylinders WC, not shown, which are incorporated in the wheel brake devices. In normal practice, the wheel brake device 72 directly supplies the brake oil pressure to the wheel cylinders WC at a level corresponding to the magnitude of a depressive force, applied to the brake pedal, which is generated in a master cylinder. However, when a wheel brake device control is initiated to avoid the traveling of the vehicle regardless of, for instance, an ABS control, a traction control, a VSC control or a manipulation on the foot brake, the wheel brake device 72 supplies the brake oil pressure to the wheel cylinders WC at a rate with no correspondence to the magnitude of the depressive force. This is for the purpose of permitting the vehicle to brake, startup and turns in run at a low-μ, (with a low coefficient of friction) road or the vehicle to be kept or maintained in a halted state.

Figure 5:
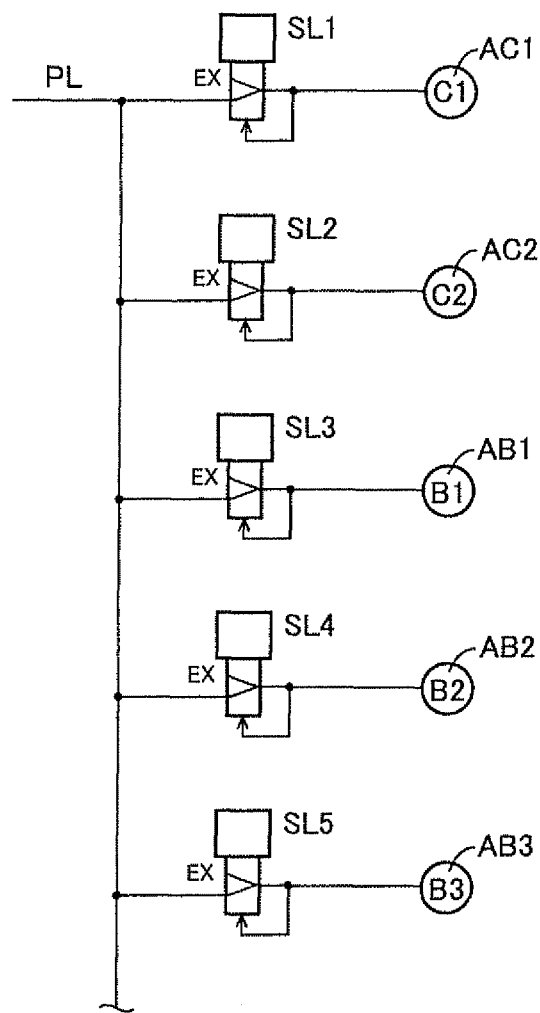
FIG. 5 is a circuit diagram related to linear solenoid valves for controlling operations of respective hydraulic actuators, such as clutches C and brakes B, of a hydraulic control circuit.

FIG. 5 is a circuit diagram related to linear solenoid valves SL1 to SL5 of the hydraulic control circuit 70 for controlling the operations of respective hydraulic actuators (hydraulic cylinders) AC1 and AC2 and AB1 to AB3 of the clutches C1, C2 and brakes B1 to B3.

As shown in FIG. 5, the hydraulic actuators AC1 and AC2 and AB1 to AB3 are connected to the respective linear solenoid valves SL1 to SL5, respectively, which are controlled in response to control commands, delivered from the electronic control unit 80. This allows the line oil pressure PL to be regulated to respective clutch engaging pressures PC1 and PC2 and PB1 to PB3, which in turn are directly applied to the respective hydraulic actuators AC1 and AC2 and AB1 to AB3. The line oil pressure PL is derived from an original hydraulic pressure delivered from a hydraulic pressure source such as an electrically operated oil pump 74 (see FIG. 4) or a mechanical type oil pump driven by the engine 30. A relief-type pressure regulator valve (regulator valve) regulates the original hydraulic pressure at a value depending on a load, etc., of the engine 8 represented in terms of the accelerator opening $A_{CC}$ or the throttle valve opening $\theta_{TH}$.

The electronic control unit 80 independently energize or de-energize the linear solenoid valves SL1 to SL5 which are fundamentally formed in the same structure. In this case, respective hydraulic pressures of the hydraulic actuators AC1 and AC2 and AB1 to AB3 are independently controlled and regulated to clutch engaging pressures PC1 and PC2 and PB1 to PB3 for the clutches C1 to C4 and the brakes B1, B2. Thus, the automatic transmission portion 20 can establish various gear positions upon coupling engagements of predetermined coupling devices on a pattern indicated on, for instance, the engagement operation diagram shown in FIG. 2. In addition, during the shifting control of the automatic transmission portion 20, a so-called clutch-to-clutch shifting is executed to simultaneously control the coupling or uncoupling states of the clutch C and the brake B afforded to the shifting operations.

Figure 6:
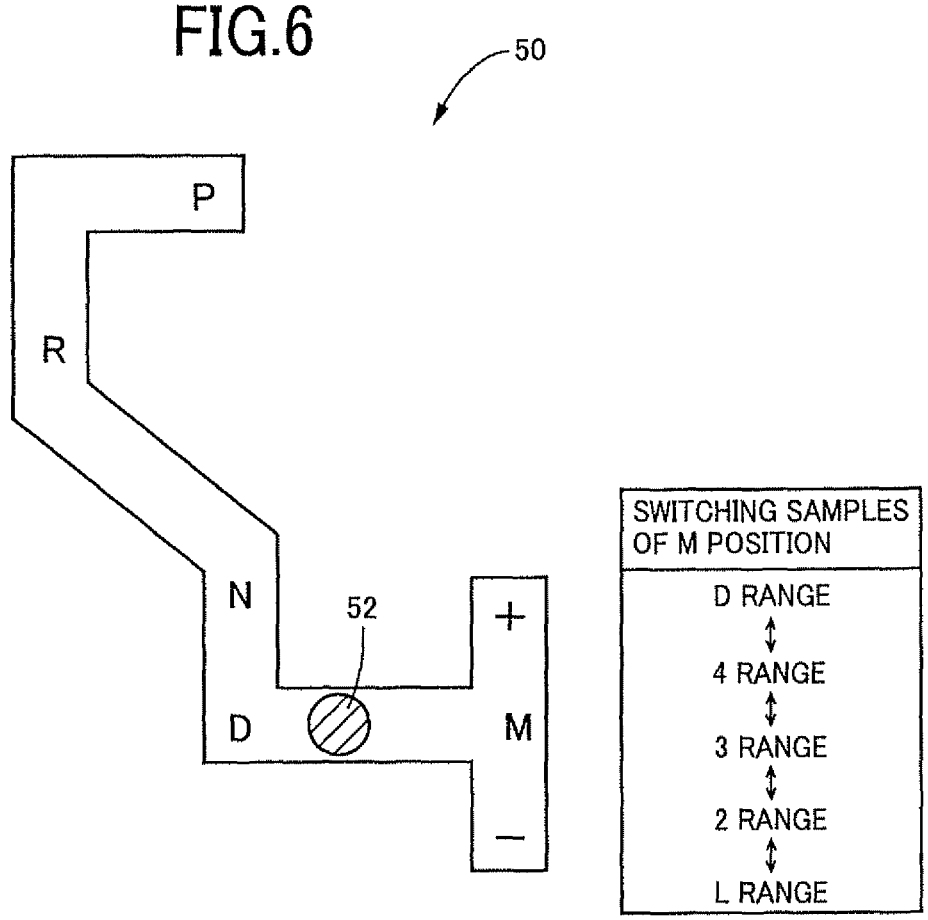
FIG. 6 is a view showing one example of a shift operation device including a shift lever operative to select one of a plurality of multiple shift positions.

FIG. 6 is a view showing an example of a manually operated shift operation device 50 serving as a changeover device operative to select one of multiple kinds of shift positions $P_{SH}$ on an artificial manipulation. The shift operation device 50 is mounted on a vehicle body in, for instance, an area lateral to a driver's seat and includes a shift lever 52 to be manipulated for selecting one of the multiple shift positions $P_{SH}$.

The shift lever 52 is manually operated to provide: a parking position "P" (Parking) under which an inside of the transmission mechanism 10, i.e., the power transmitting path inside the automatic transmission portion 20 is shut off in a neutral condition, i.e., a neutral state with the output shaft 22 of the automatic transmission portion 20 remained in a locked state; a reverse drive position "R" (Reverse) for a reverse drive mode; and a neutral position "N" (Neutral) in which the power transmitting path of the transmission mechanism 10 is shut off in the neutral state.

In addition, the shift lever 52 is manually operated to further provide: an automatic forward-shift drive position "D" (Drive) and a manual forward-shift drive position "M" (Manual). In the D position, an automatic shift mode is established to execute an automatic shift control within a varying range of the total speed ratio γT available to be shifted in the transmission mechanism 10 resulting from various gear positions whose automatic shift control is performed in an infinitely variable speed ratio width of the differential portion 11 and a range of the 1st-speed to the 4th-speed gear positions of the automatic transmission portion 20. The M position is manually shifted to establish a manual shift drive mode (manual mode) for setting a so-called shift range in which there is a limit on a shifting gear position of the automatic transmission portion 20 on a high speed gear position of the automatic shift control thereof.

For instance, the hydraulic control circuit 70 is electrically switched in conjunction with the shift lever 52 being manually operated to the various shift positions $P_{SH}$ to establish the reverse-drive gear position "R", the neutral position "N" and the various gear shift positions in the forward-drive gear position "D" as indicated in the coupling operation table of FIG. 2.

Among the various shift positions $P_{SH}$ represented in the "P" to "M" positions, the "P" and "N" positions represent non-running positions selected when no running of the vehicle is intended. That is, the "P" and "N" positions represent non-drive positions wherein the first and second clutches C1, C2 are selected to cause the power transmitting path to be switched to the power cut-off state so as to render the vehicle inoperative to interrupt the power transmitting path inside the automatic transmission portion 20 like a situation where both the first and second clutches C1, C2 are uncoupled as indicated in, for instance, the engagement operation diagram shown in FIG. 2.

The "R", "D" and "M" positions represent running positions selected when the running of the vehicle is intended. That is, these positions represent drive positions when selecting the first and/or second clutches C1, C2 to cause the power transmitting path to be switched to the power transmitting state like a situation where at least one of the first and second clutches C1, C2 is coupled, as indicated in, for instance, the engagement operation diagram shown in FIG. 2, to establish the power transmitting path inside the automatic transmission portion 20 so as to enable the vehicle to be driven.

More particularly, if the shift lever 52 is manually shifted from the "P" position or the "N" position to the "R" position, the second clutch C2 is coupled to cause the power transmitting path of the automatic transmission portion 20 to be switched from the power cut-off state to the power transmitting state. With the shift lever 52 manually shifted from the "N" position to the "D" position, at least the first clutch C1 is coupled to cause the power transmitting path of the automatic transmission portion 20 to be switched from the power cut-off state to the power transmitting state. Further, as the shift lever 52 is manually shifted from the "R" position to the "P" or "N" position, the second clutch C2 is uncoupled to cause the power transmitting path of the automatic transmission portion 20 to be switched from the power transmitting state to the power cut-off state. With the shift lever 52 manually shifted from the "D" position to the "N" position, the first clutch C1 or second clutch C2 is uncoupled to cause the power transmitting path of the automatic transmission portion 20 to be switched from the power transmitting state to the power cut-off state.

Figure 8:
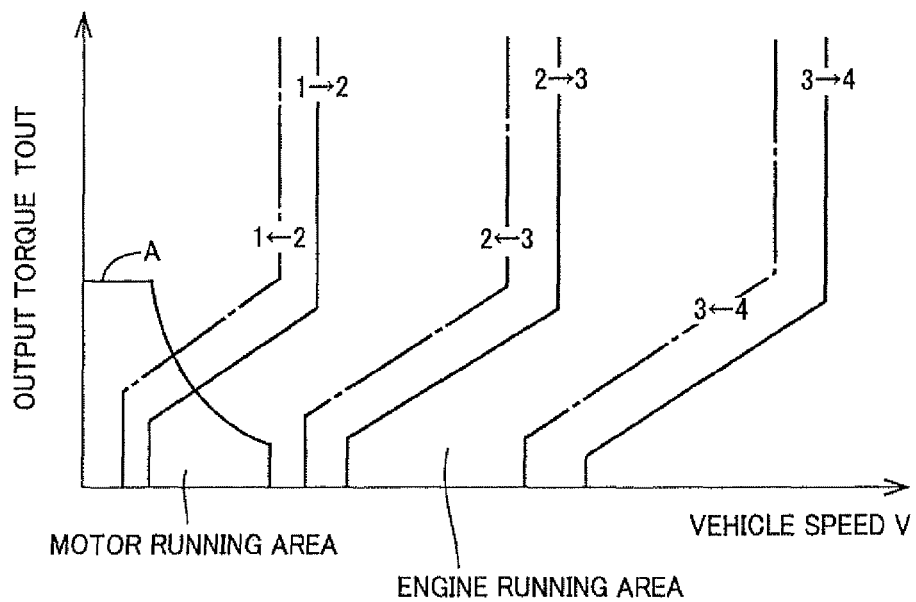
FIG. 8 is a view illustrating one example of a shifting map for use in performing a shifting control of the drive system, and one example of drive-power-source map defining boundary lines for use in a drive-power-source switching control between an engine-drive mode and a motor-drive mode with those maps being related to each other.

FIG. 7 is a functional block diagram illustrating major control functions to be executed by the electronic control unit 80. In FIG. 7, step-variable shift control means 82 preliminarily stores the relationship (shifting lines and shifting map) having upshift lines (in solid line) and downshift lines (in single dot lines) as parameters including a vehicle speed V and output torque $T_{OUT}$ of the automatic transmission portion 20 as shown in FIG. 8. The step-variable shift control means 82 determines i.e., judges whether to execute the shifting in the automatic transmission portion 20 based on the vehicle condition represented by the actual vehicle speed V and demanded output torque $T_{OUT}$ of the automatic transmission portion 20 by referring to the prestored relationship. That is, the operation is executed to determine the gear position to be shifted in the automatic transmission portion 20, which in turn executes an automatic shifting control so as to obtain the gear position that is determined.

When this takes place, the step-variable shift control means 82 outputs commands (a shift output command and a hydraulic pressure command) to the hydraulic control circuit 70 for coupling and/or uncoupling the hydraulically operated frictional coupling devices, involved in the shifting of the automatic transmission portion 20 so as to establish the gear position in accordance with the engagement operation diagram shown in FIG. 2. For instance, these commands include commands to be applied to the hydraulic control circuit 70 for uncoupling the on-uncoupling side coupling device, involved in the shifting of the automatic transmission portion 20, while coupling the on-coupling side coupling device to cause the clutch-to-clutch shifting to be executed.

Upon receipt of such commands, the hydraulic control circuit 70 uncouples the on-uncoupling side coupling device while coupling the on-coupling side coupling device so as to execute the shifting of the automatic transmission portion 20. To this end, the hydraulic control circuit 70 actuates the linear solenoid valves SL, thereby actuating the hydraulic actuators of the hydraulically operated frictional coupling devices involved in the relevant shifting.

Hybrid control means 84 operates the engine 8 in an optimum operating range at a high efficiency, while permitting the drive forces of the engine 8 and the second electric motor M2 to be distributed at optimum rate, and optimally varying a reacting force of the first electric motor M1 resulting from the operation thereof to generate electric power. This allows the speed ratio $\gamma 0$ to be controlled in an electrically controlled continuously variable transmission of the differential portion 11. At a vehicle speed V when the vehicle travels in one occasion, for instance, a target (demanded) output for the vehicle is calculated based on the accelerator opening Acc and the vehicle speed V representing a driver's output demanded variable. Thereafter, a demanded total target output is calculated based on the target output of the vehicle and the battery charge demanded value. To obtain such a total target output, a target engine output is calculated in consideration of a loss in power transmission, loads of auxiliary units and assist torque of the second electric motor M2 or the like. Then, the hybrid control means 84 controls the engine 8 while rendering the first electric motor M1 operative to generate electric power at a controlling rate, so as to obtain the engine rotation speed $N_E$ and engine torque $T_E$ such that the target engine output is obtained.

The hybrid control means 84 executes such controls in consideration of, for instance, the gear position of the automatic transmission portion 20 with a view to increasing dynamic performance and improving fuel consumption. During such hybrid controls, the differential portion 11 is rendered operative as the electrically controlled continuously variable transmission. This is because the engine rotation speed $N_E$, determined for the engine 8 to operate in the operating range at the high efficiency, is caused to match the rotation speed of the power transmitting member 18 determined with the vehicle speed V and the gear position of the automatic transmission portion 20.

Figure 9:
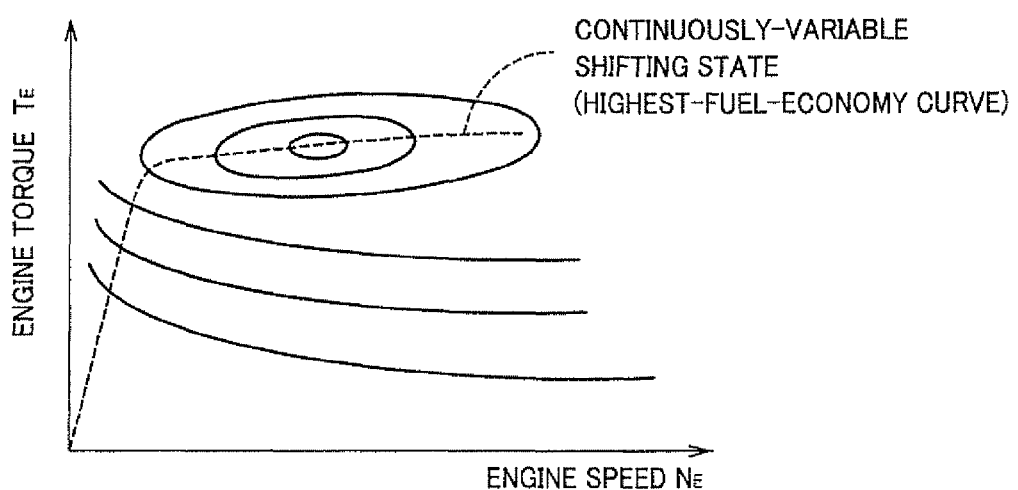
FIG. 9 is a view illustrating one example showing a fuel consumption map with a broken line representing an optimum fuel consumption curve of an engine.

That is, the hybrid control means 84 determines a target value of the total speed ratio $\gamma T$ of the transmission mechanism 10 such that the engine 8 is caused to operate along an optimal fuel efficiency curve (a fuel efficiency map and the relationships) thereof as indicated by a dotted line in FIG. 9 which is preliminarily and experimentally obtained and prestored. This achieves a compromise between driveability and fuel consumption during the running of the vehicle under a continuously variable shifting mode on a two-dimensional coordinate established with the engine rotation speed $N_E$ and output torque (engine torque) $T_E$ of the engine 8. For instance, the target value of the total speed ratio $\gamma T$ of the transmission mechanism 10 is determined so as to obtain engine torque $T_E$ and the engine rotation speed $N_E$ for generating the engine output demanded for satisfying target outputs (a total target output and demanded drive torque). Then, to obtain such a target value, the speed ratio $\gamma 0$ of the differential portion 11 is controlled in consideration of the gear position of the automatic transmission portion 20, thereby infinitely controlling the total speed ratio $\gamma T$ within a shiftable varying range.

When this takes place, the hybrid control means 84 allows electric energy, generated by the first electric motor M1, to be supplied through the inverter 54 to the battery 56 and the second electric motor M2. Thus, a major part of drive power of the engine 8 is mechanically transferred to the power transmitting member 18. However, a remaining part of drive power of the engine 8 is consumed with the first electric motor M1 for the generation of electric power for conversion into electric energy. Resulting electric energy is supplied through the inverter 54 to the second electric motor M2, which outputs drive power to the power transmitting member 18. Equipment, involved in a phase starting from the step of generating electric power to the step of causing the second electric motor M2 to consume resultant electric energy, establishes an electric path such that the part of drive power of the engine 8 is converted into electric energy and resultant electric energy is converted into mechanical energy.

The hybrid control means 84 allows the differential portion 11 to perform an electrically controlled CVT function for controlling, for instance, a first electric-motor rotation speed $N_{M1}$. This allows the engine rotation speed $N_E$ to be maintained at a nearly constant level or to be rotatably controlled at an arbitrary level. In other words, the hybrid control means 84 allows the engine rotation speed $N_E$ to be maintained at the nearly constant level or to be rotatably controlled at the arbitrary rotation speed, while rotatably controlling the first electric-motor rotation speed $N_{M1}$ at the arbitrary level.

As will be apparent from the collinear chart shown in FIG. 3, for instance, when raising the engine rotation speed $N_E$ during the running of the vehicle, the hybrid control means 84 raises the first electric-motor rotation speed $N_{M1}$ while maintaining the second electric-motor rotation speed $N_{M2}$ at the nearly fixed level that is bound with the vehicle speed V (represented by speeds of the drive wheels 34). In addition, when maintaining the engine rotation speed $N_E$ at the nearly fixed level during the shifting of the automatic transmission portion 20, the hybrid control means 84 varies the first electric-motor rotation speed $N_{M1}$ in a direction opposite to that in which the second electric-motor rotation speed $N_{M2}$ varies with the shifting of the automatic transmission portion 20 while maintaining the engine rotation speed $N_E$ at the nearly fixed level.

The hybrid control means 84 functionally includes engine output control means. This causes the throttle actuator 64 to controllably open or close the electronic throttle valve 62 for performing a throttle control. In addition, the engine output control means outputs commands singly or in combination to an engine output control device 58 for permitting a fuel injection device 66 to control a fuel injection quantity and a fuel injection timing for fuel injection control while causing an ignition device 68 to control an ignition timing thereof such as an igniter or the like for an ignition timing control. Upon receipt of such commands, the engine output control device 58 executes an output control of the engine 8 so as to provide a demanded engine output.

For instance, the hybrid control means 84 executes the throttle control by fundamentally referring to the prestored relationship (not shown) so as to drive the throttle actuator 60 in response to the accelerator opening Acc such that the greater the accelerator opening Acc, the larger will be the throttle valve opening $\theta_{TH}$. Upon receipt of the commands delivered from the hybrid control means 84, further, the engine output control device 58 allows the throttle actuator 64 to controllably open or close the electronic throttle valve 62 for performing the throttle control while controlling the ignition timing of the ignition device 68 such as the igniter or the like for ignition timing control, thereby executing the engine torque control.

Further, the hybrid control means 84 renders the differential portion 11 operative to perform the electrically controlled CVT function (differential action) to cause the vehicle to run in the motor drive mode, regardless of a halted state or idling state of the engine 8.

For instance, the hybrid control means 84 determines whether the vehicle remains in a motor running area or an engine running area. Such determination is executed based on the vehicle condition, represented by the actual vehicle speed V and the accelerator opening Acc, upon utilizing the relationship (drive-power-source switching lines and drive-power-source map). As shown in FIG. 8, this relationship has boundary lines between an engine running area and a motor running area for causing the engine 8 and the second electric motor M2 to be switched as a running drive-power source for thereby executing either a motor-drive running mode or an engine-drive running mode. Such a relationship is prestored in terms of parameters involving the vehicle speed V and output torque $T_{OUT}$ of the automatic transmission portion 20 as shown in FIG. 8.

A drive-power source map, indicated by a solid line A in FIG. 8, is preliminarily stored with shifting maps indicated by, for instance, solid lines and single dot lines in FIG. 8. As will be apparent from FIG. 8, the hybrid control means 84 executes the motor-drive running mode at relatively low output torque $T_{OUT}$, generally regarded to be lower in engine efficiency than that achieved at high torque, i.e., in a low engine torque $T_E$ range, or in a relatively low vehicle speed range of the vehicle speed V, i.e., at a low load range.

In order to suppress a drag of the engine 8 sustained under a halted state for improving fuel consumption during such a motor-drive running mode, the hybrid control means 84 controls the first electric-motor rotation speed $N_{M1}$ in a negative phase in rotation speed. This allows, for instance, the first electric-motor to operate under an unloaded condition, thereby achieving an idling state. This results in a consequence of the differential portion 11 enabled to perform the electrically controlled CVT function (differential action) whereby the engine rotation speed $N_E$ is zeroed or nearly zeroed depending on needs.

Even if the engine running area is present, the hybrid control means 84 allows the first electric motor M1 and/or the battery 56 to supply electric energy to the second electric motor M2 using the electrical path mentioned above. This drives the second electric motor M2 to apply torque to the drive wheels 34, making it possible to provide a so-called torque-assist for assisting drive power of the engine 8.

The hybrid control means 84 renders the first electric motor M1 operative to assume the unloaded condition for free rotation under the idling state. This makes it possible to disenable a torque transfer of the differential portion 11, i.e., under a status equal to a state under which the power transmitting path is disconnected in the differential portion 11 and no output is generated from the differential portion 11. That is, with the first electric motor M1 placed under the unloaded condition, the hybrid control means 84 makes it possible to place the differential portion 11 in a neutral condition (neutral state) in which the power transmitting path is electrically disconnected.

Meanwhile, with the transmission mechanism 10 of the present embodiment, under a circumstance where the "D" position or "R" position is selected in the shift device 50, the power-transmitting-member rotation speed $N_{18}$ is bound with the rotation speed of the output member of the automatic transmission portion 20 like the output-shaft rotation speed $N_{OUT}$ and the vehicle speed V, etc. For instance, the power-transmitting-member rotation speed $N_{18}$ (=Output–shaft rotation speed $N_{OUT}$×Speed ratio γ) is uniquely determined with the output-shaft rotation speed $N_{OUT}$ and the speed ratio γ corresponding to that of the gear position of the automatic transmission portion 20.

Figure 20:
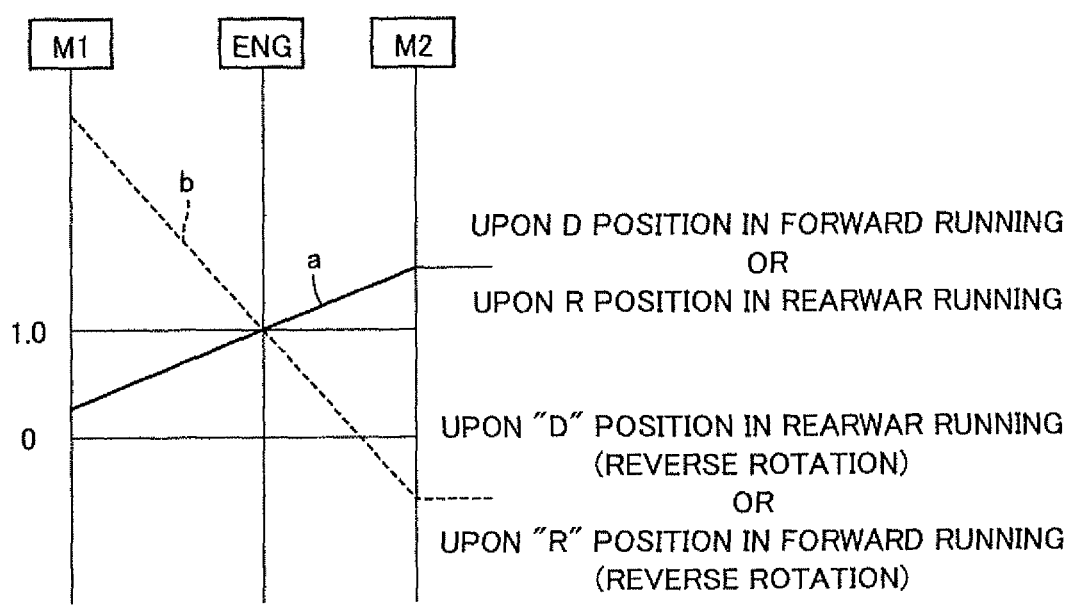
FIG. 20 is a well-known collinear chart, showing rotation speeds of various rotary elements forming an electric differential portion, on which exemplary rotational states of the various rotary elements are plotted. The states include one phase in which the rotational direction of the drive wheels is identical to the rotational direction of the same with the shift position being set to the running position, and another phase in which the rotational direction of the drive wheels becomes opposite to the rotational direction of the same with the shift position being set to the running position.

Under a circumstance where the running position, such as the "D" position or "R" position or the like, is selected, it is likely that the vehicle travels on a sloping road to cause the drive wheels 34 to rotate in a direction opposite to the rotational direction of the same with the shift position being set to the running position. In such a case, as shown in FIG. 20, the power-transmitting-member rotation speed $N_{18}$ lies in the opposite direction, i.e., in a negative rotation speed. Thus, the first electric-motor rotation speed $N_{M1}$ tends to increase to a high level in contrast to a case when the rotational direction of the drive wheels 34 lies in the same rotational direction as that of the drive wheels 34 with the shift position being set to the running direction.

That is, the first electric-motor rotation speed $N_{M1}$ lies at the high speed rotation depending on the engine rotation speed $N_E$ and the power-transmitting-member rotation speed $N_{18}$ on the ground of the relationship on the relative rotation speeds among the power-transmitting-member rotation speed $N_{18}$, engine rotation speed $N_E$ and first electric-motor rotation speed $N_{M1}$ in the differential portion 11. As a result, a probability arises with an adverse affect on durability of the first electric motor M1.

To avoid such an adverse affect, the first embodiment contemplates the provision of reverse drive force suppression means 86. Under a circumstance where the rotational direction of the drive wheels 34 becomes opposite to the rotational direction of the same under the running position selected by the shift device 50, the reverse drive force suppression means 86 prevents a reverse drive force from being input from the output member, such as the output shaft 22 or the drive wheels 34, etc., of the automatic transmission portion 20 to the differential portion 11. In another point of view, if the rotational direction of the drive wheels 34 becomes opposite to the rotational direction of the same under the running position selected by the shift device 50, the reverse drive force suppression means 86 precludes the rotation of the output member of the automatic transmission portion 20 from being transferred to the power transmitting member 18.

More particularly, shift position determining means 88 determines a current shift position of the shift lever 52 based on the signal representing the shift position $P_{SH}$ of the shift lever 52. Thus, the shift position determining means 88 determines whether or not the shift lever 52 is placed in the running position, i.e., the drive position such as the "D" position or "R" position.

During the operation of the shift position determining means 88 determining that the shift lever 52 is currently placed in the running position, reverse rotation determining means 90 determines whether or not the rotational direction of the drive wheels 34 becomes opposite to that of the same with the shift position currently set to the running position. For instance, under a circumstance where the shift position determining means 88 determines that the shift lever 52 is currently placed in the "D" position, the reverse rotation determining means 90 determines whether or not the output-shaft rotation speed $N_{OUT}$ lies in a direction opposite to a rotational direction of the output-shaft rotation speed $N_{OUT}$ in the "D" position, i.e., in a negative rotation speed. Moreover, for instance, during the operation of the shift position determining means 88 determined that the shift lever 52 is currently placed in the "R" position, the reverse rotation determining means 90 determines whether or not the output-shaft rotation speed $N_{OUT}$ lies in a rotational direction opposite to the rotation of the same with the "R" position being set in the shift position.

The reverse drive force suppression means 86 includes rotation stop means 92. When the reverse rotation determining means 90 determines that the rotational direction of the drive wheels 34 becomes opposite to the rotational direction of the same with the shift position being set to the current running position, the rotation stop means 92 stops the rotation of the output member of the automatic transmission portion 20. This blocks the output member of the automatic transmission portion 20 from rotating in a reverse direction.

The rotation stop means 92 locks the rotations of, for instance, the rotary elements forming the automatic transmission portion 20. That is, the rotation stop means 92 allows the automatic transmission portion 20 to be placed in a locked state, thereby stopping the rotation of the output member of the automatic transmission portion 20. In connection to the automatic transmission portion 20 of the first embodiment, coupling at least two elements of the brakes B1 to B3, or coupling the clutches C1 and C2 and at least one of the brakes B1 to B3 enables the automatic transmission portion 20 to be placed in the locked state.

Due to the provision of the one-way clutch F1 located in parallel to the third brake B3, setting the 2nd-speed gear position to the 4th-speed gear position in the "D" position avoids the occurrence of the reverse drive (in reverse rotation). More particularly, when the reverse rotation determining means 90 determines that the rotational direction of the drive wheels 34 becomes opposite to the rotational direction of the same with the shift position being set to the current running position, the rotation stop means 92 outputs either one of commands to the step-variable shift control means 82 as described below. These commands include a command for at least two of the brakes B1 to B3 to be coupled, and another command for the clutches C1 and C2 and at least one of the brakes B1 to B3 to be coupled.

Especially, when the reverse rotation determining means 90 determines that the drive wheels 34 take the rotational direction opposite to the rotational direction of the same in the "D" position, the rotation stop means 92 outputs the command to the step-variable shift control means 82 for causing the automatic transmission portion 20 to shift into either one of the 2nd-speed gear position to the 4th-speed gear position.

Instead of or in addition to the function of blocking the rotations of the rotary elements forming the automatic transmission portion 20, the rotation stop means 92 serves to actuate the wheel brake device of the vehicle for thereby stopping the rotation of the output member of the automatic transmission portion 20. More particularly, the rotation stop means 92 outputs a wheel brake device actuation signal for actuating a wheel brake device 72 (refer to FIG. 4).

Figure 10:
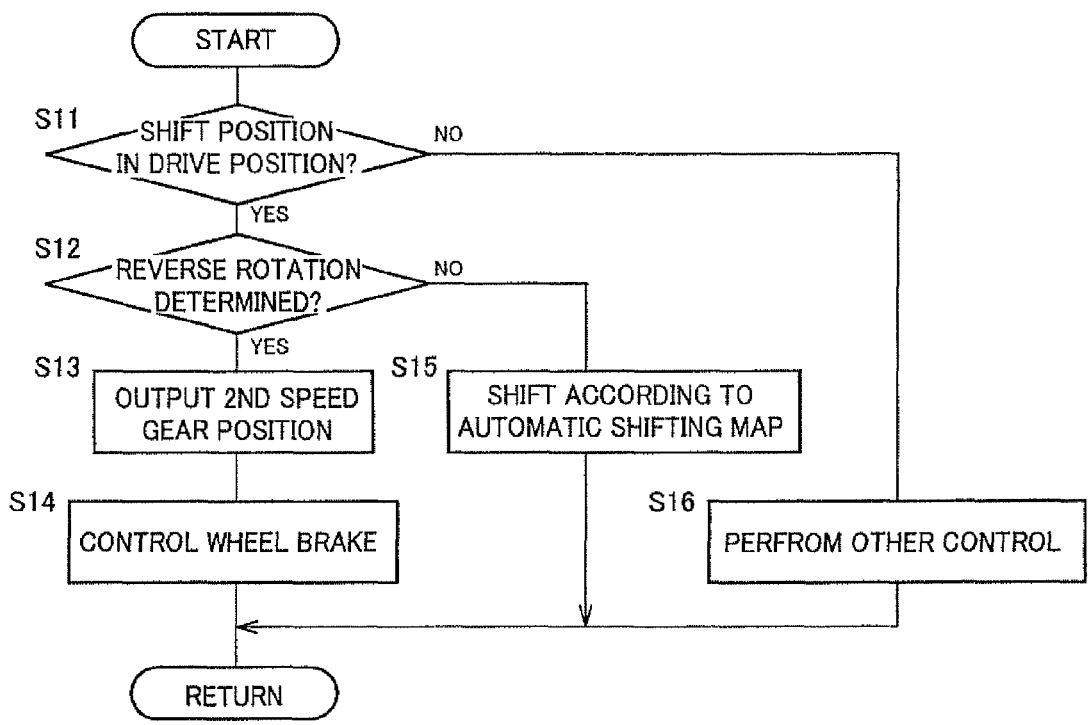
FIG. 10 is a flowchart illustrating a basic sequence of control operations to be executed by the electronic control unit, that is, the basic sequence of control operations to be executed for suppressing a high-speed rotation of a first electric-motor even if a rotational direction of drive wheels becomes opposite to the rotational direction of the same with a shift position being set to a running position.

FIG. 10 is a flowchart showing a basic sequence of major control operations to be executed by the electronic control unit 80, i.e., a basic sequence of control operations for preventing the first electric motor M1 from rotating at a high speed even when the rotational direction of the drive wheels 34 is determined to be opposite to the rotational direction of the drive wheels in the "D" position. Such a sequence is repeatedly executed on an extremely short cycle in the order of, for instance, several milliseconds or several tens milliseconds.

First in step (hereinafter the term "step" will be omitted) S11 corresponding to the shift position determining means 88 in FIG. 10, a current shift position of the shift lever 52 is determined in response to a signal representing the shift position $P_{SH}$ thereof. Then, the operation is executed to determine whether or not the current shift position of the shift lever 52 remains in the running position, i.e., the drive position such as the "D" position or "R" position.

If the determination in S11 is made negative, then, in S16, other controls than those executed in S12 to S15 described below are executed or the current routine is terminated.

If the determination in S11 is made positive, then, in S12 corresponding to the reverse rotation determining means 90, the operation is executed to determinate whether or not the drive wheels 34 rotate in a direction opposite to the rotational direction of the same with the shift position being set to the running position. For instance, if the current running position remains in the "D" position, then, the operation is executed to determine whether or not the output-shaft rotation speed $N_{OUT}$ lies in a rotational direction opposite to that in the "D" position, that is, whether or not the output-shaft rotation speed $N_{OUT}$ is involved in a negative rotation speed. In addition, if the current running position remains in the "R" position, then, the operation is executed to determine whether or not the output-shaft rotation speed $N_{OUT}$ lies in a rotational direction opposite to the rotational direction of the same with the shift position being set to the "R" position, that is, whether or not the output-shaft rotation speed $N_{OUT}$ is involved in a positive rotation speed.

If the determination in S12 is made negative, then, in S15 corresponding to the step-variable shift control means 82 and hybrid control means 84, the vehicle is caused to normally run with the shift position set to the current running position. Especially, in the "D" position, the automatic transmission portion 20 is caused to execute a normal automatic shifting mode. Meanwhile, the speed ratio γ0 of the differential portion 11 is controlled in consideration of the gear position of the automatic transmission portion 20 so as to allow a whole of the transmission mechanism 10 to achieve an infinitely variable gear shifting.

On the contrary, if the determination in S12 is made positive, then, in S13 corresponding to the reverse drive force suppression means 86 (the rotation stop means 92), the rotary elements, forming the automatic transmission portion 20, are locked in rotation, thereby blocking the rotation of the output member of the automatic transmission portion 20. To this end, for instance, a command is output to cause at least two of the brakes B1 to B3 to be coupled, or another command is output to cause the clutches C1 and C2 and at least one of the brakes B1 to B3 to be coupled.

Particularly in the "D" position, the command is output to cause the automatic transmission portion 20 to shift into either one of the 2nd-speed gear position to 4th-speed gear position, in contrast to a case in which the automatic transmission portion 20 assumes a gear position that is normally set to the 1st-speed gear position at a low vehicle speed (or in a halted state). This causes the one-way clutch F1 to block the occurrence of the reverse drive (the reverse rotation of the output member of the automatic transmission portion 20). Thus, the output member of the automatic transmission portion 20 is prevented from rotating in the reverse direction, which precludes the reverse rotation of the power transmitting member 18. Therefore, the first electric motor M1 is prevented from rotating at a high speed.

In succeeding S14 corresponding to the reverse drive force suppression means 86 (the rotation stop means 92), the wheel brake device of the vehicle is actuated almost as soon as the operation in S13 is executed. This blocks the rotation of the output member of the automatic transmission portion 20. For instance, the wheel brake device actuation signal is output for actuating the wheel brake device 72 so as to prevent the movement of the vehicle. This ensures the first electric motor M1 from rotating at a high speed in doubled effects.

In the first illustrated embodiment, when the reverse rotation determining means 90 (in S12) determines that the rotational direction of the drive wheels 34 becomes opposite to the rotational direction of the same with the shift position being set to the current running position, the rotation stop means 92 (in S13 and S14) allows the automatic transmission portion 20 to be placed in the locked state while additionally actuating the wheel brake device of the vehicle. However, it may suffice to execute at least one of the operation to lock the automatic transmission portion 20 and the operation to actuate the wheel brake device. That is, it will suffice to allow at least one of the operations in S13 and S14 to be executed.

In the first illustrated embodiment set forth above, under a circumstance where the rotational direction of the drive wheels 34 becomes opposite to the rotational direction of the same with the shift operation device 50 selected the running position, the reverse drive force suppression means 86 prevents the output member of the automatic transmission portion 20, such as the output shaft 22 or the drive wheels 34, etc., from inputting a reverse drive force to the differential portion 11. Accordingly, the power transmitting member 18 is not rotatably driven in a direction opposite to a rotational direction of the same with the shift position being set to the running position. This suppresses the first electric-motor rotation speed $N_{M1}$ from reaching a high-speed rotation determined with the engine rotation speed $N_E$ and transmitting-member rotation speed $N_{18}$ on the ground of the relationship on the relative rotation speeds of the rotary elements of the differential portion 11. This results in improved durability of the first electric motor M1.

In the first illustrated embodiment, the rotation stop means 92 blocks the rotations of the output member of the automatic transmission portion 20. This prevents the power transmitting member 18 from being rotatably driven in the direction opposite to the rotational direction of the same with the shift position being set to the running position. As a consequence, the first electric-motor rotation speed $N_{M1}$ can be properly prevented from reaching a high level.

In the first illustrated embodiment, the rotation stop means 92 blocks the rotations of the rotary elements forming the automatic transmission portion 20, thereby properly blocking the rotation of the output member of the automatic transmission portion 20.

In the first illustrated embodiment, the rotation stop means 92 allows the automatic transmission portion 20 to shift in a gear position for the one-way clutch to be coupled. This properly blocks the rotations of the rotary elements of the automatic transmission portion 20.

In the first illustrated embodiment, the rotation stop means 92 actuates the wheel brake device of the vehicle, thereby properly blocking the rotation of the output member of the automatic transmission portion 20.

Next, another embodiment according to the present invention will be described below. Also, in the following description, like component parts, common to various embodiments, bear like reference numerals with detailed description of the same is herein omitted.

Second Embodiment

Figure 11:
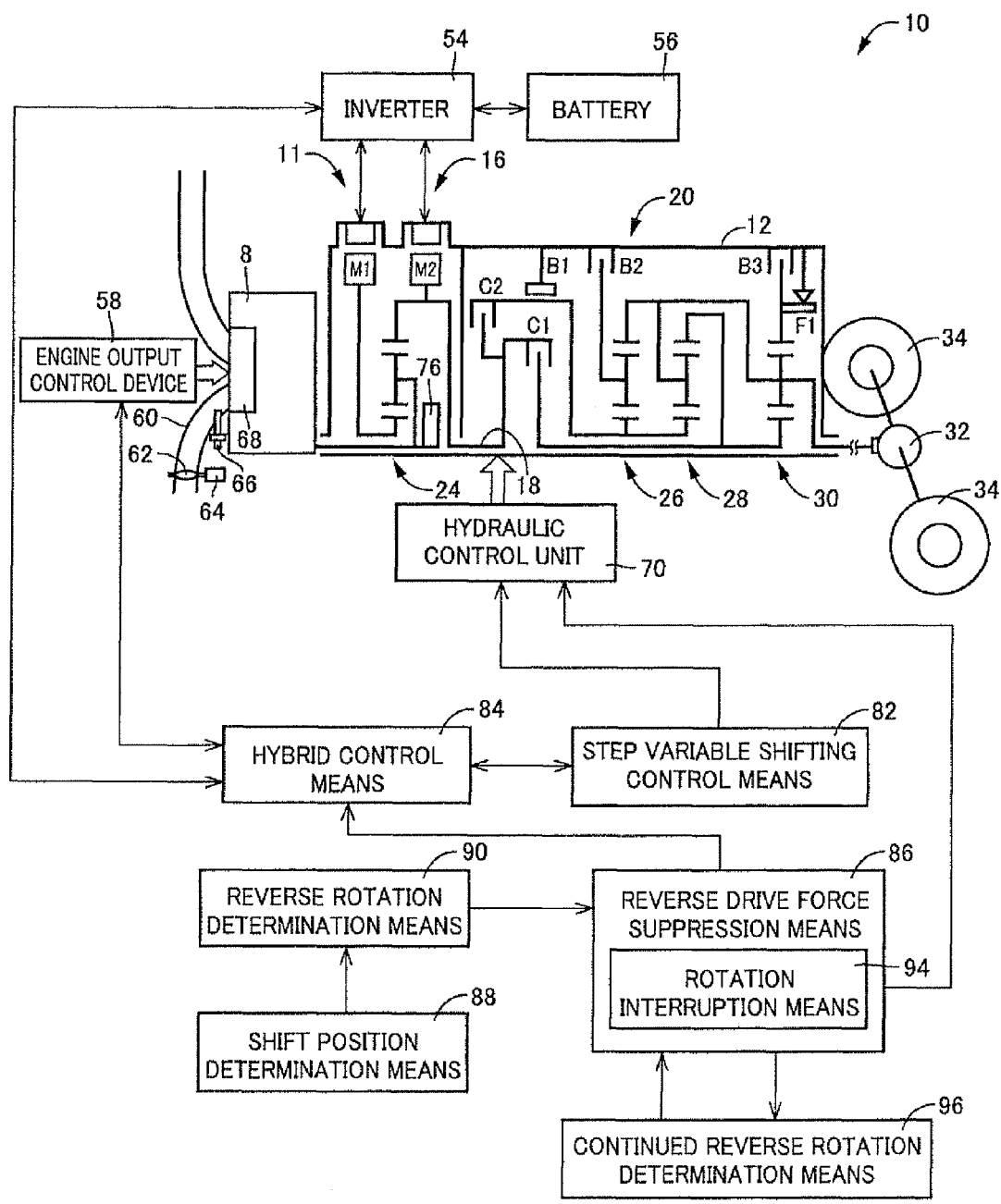
FIG. 11 is a functional block diagram illustrating major control functions to be executed by the electronic control unit of FIG. 4 in another embodiment, corresponding to the functional block diagram shown in FIG. 7.

FIG. 11 is a functional block diagram illustrating major control functions to be executed by an electronic control unit 80 in another embodiment corresponding to the embodiment shown in FIG. 7. The present embodiment differs from the embodiment, shown in FIG. 7, in that the reverse drive force suppression means 86 includes rotation interruption means 94 in place of the rotation stop means 92. The rotation interruption means 94 serves to interrupt a rotation transfer from the output member of the automatic transmission portion 20 to the differential portion 11. Such interruption is executed when the reverse rotation determining means 90 determines that the rotational direction of the drive wheels 34 becomes opposite to the rotational direction of the same with the shift position being set to the current running position.

In FIG. 11, the rotation interruption means 94 interrupts the rotation transfer from the output member of the automatic transmission portion 20 to the differential portion 11. To this end, the rotation interruption means 94 operates so as to uncouple the clutches C and brakes B such that the power transmitting path of the automatic transmission portion 20 is interrupted under a neutral state. Speaking such operation in connection with the automatic transmission portion 20 of the present embodiment, among the clutches C and brakes B, at least the first and second clutches C1 and C2 are uncoupled, thereby enabling the automatic transmission portion 20 to be placed in the neutral state.

More particularly, the rotation interruption means 94 outputs a command for uncoupling the clutches C1, C2, i.e., an inhibit command to the hydraulic control circuit 70.

In other words, the rotation interruption means 94 outputs a command for interrupting the supply of clutch engaging hydraulic pressure to the clutches C1, C2 to interrupt the coupling engagements of these component parts, regardless of the hydraulic pressure command delivered from the step-variable shift control means 82. Such a command is output when the reverse rotation determining means 90 determines that the rotational direction of the drive wheels 34 becomes opposite to the rotational direction of the same with the shift position being set to the current running position. Upon receipt of such a command, the hydraulic control circuit 70 actuates the internal linear solenoid valves SL1, SL2 so as to interrupt the supply of clutch engaging hydraulic pressure to the clutches C1, C2. This causes the clutches C1, C2 to be uncoupled, permitting the automatic transmission portion 20 to be placed in the neutral state.

After the rotation interruption means 94 has output such an inhibit command, continued reverse rotation determination means 96 determines whether or not the rotational direction of the drive wheels 34 becomes opposite to the rotational direction of the same with the shift position being set to the current running position and still remains in the reverse rotation. From another point of view, the continued reverse rotation determination means 96 determines whether or not the hydraulic control circuit 70 is incapable of interrupting the supply of clutch engaging hydraulic pressure to the clutches C1, C2 regardless of the presence of the inhibit command delivered from the rotation interruption means 94.

When the shift position determining means 88 determines that the "D" position is present, the continued reverse rotation determination means 96 determines whether or not the second electric-motor rotation speed $N_{M2}$ lies in a rotational direction opposite to that of the same with the shift position being set to the "D" position, that is, whether or not the second electric-motor rotation speed $N_{M2}$ is involved in a negative rotation speed. Such determination is executed when a given time interval, preliminarily obtained on experiments, has elapsed after the rotation interruption means 94 has output such an inhibit command. In addition, for instance, with the shift position determining means 88 determined that the "R" position is set, the continued reverse rotation determination means 96 determines whether or not the second electric-motor rotation speed $N_{M2}$ lies in the rotational direction opposite to that of the same with the shift position set to the "R" position, that is, whether or not it is involved in a normal rotational direction in response to the inhibit command signal output from the rotation interruption means 94.

Sometimes the continued reverse rotation determination means 96 determines that the rotational direction of the drive wheels 34 becomes opposite to the rotational direction of the same with the shift position being set to the current running position and still remains in the reverse rotation. When this takes place, the rotation interruption means 94 interrupts a rotational transfer from the output member of the automatic transmission portion 20 to the differential portion 11 (power transmitting member 17). To achieve such interruption, the hydraulic pressure source, operative to supply the original pressure to be regulated to the clutch engaging hydraulic pressure being applied to the clutch C and brake B, is stopped in operation. This uncouples the clutch C and brake B, thereby interrupting the power transmitting path of the automatic transmission portion 20.

More particularly, if the continued reverse rotation determination means 96 determines that the reverse rotation of the drive wheels 34 is still sustained, the rotation interruption means 94 outputs a command to the hybrid control means 84 to stop the rotatable drive of the engine 8 so as to stop the operation of the mechanical type oil pump 76. However, no drive command signal is output for actuating an electric oil pump 74 so as to stop the operation thereof.

Figure 12:
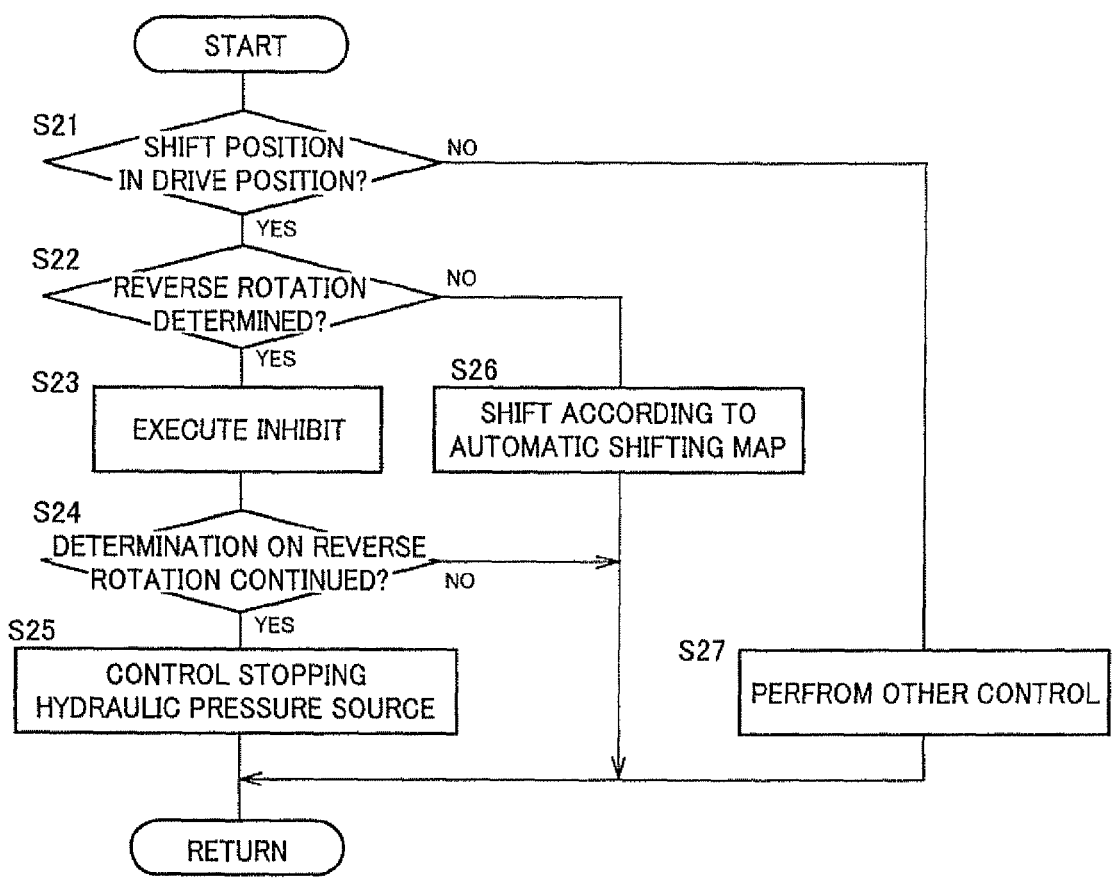
FIG. 12 is a flowchart illustrating a basic sequence of control operations to be executed by the electronic control unit shown in FIG. 4, that is, the basic sequence of control operations to be executed for suppressing the high-speed rotation of the first electric-motor even if the rotational direction of the drive wheels becomes opposite to the rotational direction of the same with the shift position being set to the running position.

FIG. 12 is a flowchart showing a basic sequence of major control operations to be executed by the electronic control unit 80, that is, a basic sequence of control operations for preventing the first electric motor M1 from rotating at a high speed, even when the rotational direction of the drive wheels 34 is determined to be opposite to the rotational direction of the drive wheels in the running position. Such a sequence is repeatedly executed on an extremely short cycle in the order of, for instance, several milliseconds or several tens milliseconds. The flowchart shown in FIG. 12 represents another embodiment corresponding to the embodiment shown in FIG. 10.

First in step S21 corresponding to the shift position determining means 88 in FIG. 12, a current shift position of the shift lever 52 is determined in response to a signal representing the shift position $P_{SH}$ of the shift lever 52. Then, the operation is executed to determine whether or not the current shift position of the shift lever 52 lies in the running position such as the "D" position or "R" position, that is, whether or not the current shift position lies in the drive position.

If the determination in S21 is made negative, then, in S27, other controls than those executed in S22 to S26 described below are executed or the current routine is terminated.

If the determination in S21 is made positive, then, in S22 corresponding to the reverse rotation determination means 90, the operation is executed to determine whether or not the rotational direction of the drive wheels 34 becomes opposite to the rotational direction of the same with the shift position being set to the current running position.

If the determination in S22 is made negative, then, in S26 corresponding to the step-variable shift control means 82 and hybrid control means 84, the vehicle is rendered operative to normally run for the current running position.

If the determination in S22 is made positive, then, in S23 corresponding to the reverse drive force suppression means 86 (rotation interruption means 94), a command is output for both the clutches C1, C2 to be uncoupled. This causes the automatic transmission portion 20 to be placed in the neutral state for interrupting the power transmitting path. Such a command includes an inhibit command for executing inhibit control to interrupt the supply of clutch engaging hydraulic pressure to the clutches C1, C2 for inhibiting the coupling engagements thereof. This interrupts the output member of the automatic transmission portion 20 from performing the rotation transfer to the differential portion 11 (power transmitting member). Thus, no reverse rotation of the power transmitting member 18 occurs, avoiding the first electric motor M1 from rotating at the high speed.

Subsequently, in S24 corresponding to the continued reverse rotation determination means 96, the operation is executed to determine whether or not the rotational direction of the power transmitting member 18 becomes opposite to the rotational direction of the same with the current running position being set and still continuously remains in such a reverse direction regardless of the inhibit control being executed.

If the determination in S24 is made negative, then, the current routine is terminated. On the contrary, if the determination in S24 is made positive, then, in S25 corresponding to the reverse drive force suppression means 86 (rotation interruption means 94), the hydraulic pressure source is stopped in operation to uncouple the clutches C and brakes B. This allows the automatic transmission portion 20 to be placed in the neutral state for interrupting the power transmitting path.

For instance, a command is output and the operation of the engine 8 is stopped, causing the operation of the mechanical type oil pump 76 to be halted. In this case, no drive command signal for actuating the electric oil pump 74 is output for the operation thereof to be stopped. This reliably ensures the interruption of the rotation transfer from the output member of the automatic transmission portion 20 to the differential portion 11 (power transmitting member 11). This prevents the power transmitting member 18 from rotating in a reverse direction. As a result, the first electric motor M1. can be reliably avoided from rotating at a high speed.

In the second illustrated embodiment, the rotation interruption means 94 halts the operation of the hydraulic pressure source (electric oil pump 74 and mechanical type oil pump 76) when the power transmitting member 18 still continuously remains in the reverse direction even after the inhibit signal has been output. However, not by the phase with the reverse rotation continuously sustained but under the condition in which the reverse rotation determination means 90 determines that the rotational direction of the drive wheels 34 becomes opposite to the rotational direction of the same with the shift position being set to the current running position, the hydraulic pressure source may be stopped in operation in place of the inhibit signal for thereby interrupting the supply of hydraulic pressure to the clutch C and brake B. That is, in S23 shown in FIG. 12, the operation in S25 may be executed to perform an oil pressure stop control in place of executing the inhibit control. Accordingly, in such a case, none of the operations in S24 and S25 may be executed.

In the second illustrated embodiment, as set forth above, the rotation interruption means 94 interrupts the rotation transfer from the output member of the automatic transmission portion 20 to the power transmitting member 18. Accordingly, this prevents the power transmitting member 18 from rotating in the direction opposite to the rotational direction of the same when the running position is set. This can properly suppress the first electric motor M1 from rotating at a high speed.

In the second illustrated embodiment, the rotation interruption means 94 uncouples the clutches C1, C2 so as to interrupt the power transmitting path of the automatic transmission portion 20, thereby properly suppressing the rotation transfer from the output member of the automatic transmission portion 20.

In the second illustrated embodiment, the rotation interruption means 94 controls the hydraulic control circuit 70 for interrupting the supply of hydraulic pressure to the clutches C1, C2. This causes the clutches C1, C2 to be uncoupled, thereby properly interrupting the power transmitting path of the automatic transmission portion 20.

In the second illustrated embodiment, the rotation interruption means 94 stops the operation of the hydraulic pressure source (electric oil pump 74 and mechanical type oil pump 76), thereby interrupting the supply of hydraulic pressure to the clutch C and brake B. This properly prevents the supply of hydraulic pressure to the clutches C1, C2.

In the second illustrated embodiment, if the hydraulic pressure control circuit 70 is controlled with no supply of hydraulic pressure to the clutches C1, C2 being interrupted, the rotation interruption means 94 stops the operations of the hydraulic pressure sources (electric oil pump 74 and mechanical type oil pump 76). This ensures the interruption of the supply of hydraulic pressure to the clutches C1, C2.

Third Embodiment

Under a circumstance where the rotational direction of the drive wheels 34 becomes opposite to the rotational direction of the same with the running position selected by the shift operation device 50, the reverse drive force suppression means 86 performs output-member reverse-rotation preventive control and power-transmitting path interruptive control. The output-member reverse-rotation preventive control allows the automatic transmission portion 20 to be placed in a locked state or the wheel brake device to be actuated, thereby halting the rotation of the output member of the automatic transmission portion 20. The power-transmitting path interruptive control allows the hydraulic control circuit 70 to interrupt the supply of hydraulic pressure to the clutches C1, C2 or the hydraulic pressure source to be stopped in operation. This interrupts the rotation transfer from the output member of the automatic transmission portion 20 to the power transmitting member 18. These two control modes may be performed singly or in combination. This allows the reverse drive force suppression means 86 to function as motor high-speed-rotation preventive control means that properly executes motor high-speed-rotation preventive control for suppressing the high-speed rotation of the first electric-motor rotation speed $N_{M1}$.

Meanwhile, even under a situation where the rotational direction of the drive wheels 34 is regarded to be opposite to the rotational direction of the same with the running position selected by the shift operation device 50, if the first electric-motor rotation speed $N_{M1}$ does not reach a high-speed rotation, no need arises for the motor high-speed-rotation preventive control to be executed. That is, when the output member of the automatic transmission portion 20 remains at a low-rotation speed and the first electric-motor rotation speed $N_{M1}$ does not reach an appreciable high-speed rotation, the motor high-speed-rotation preventive control may suffice not to be executed beyond necessity.

Figure 13:
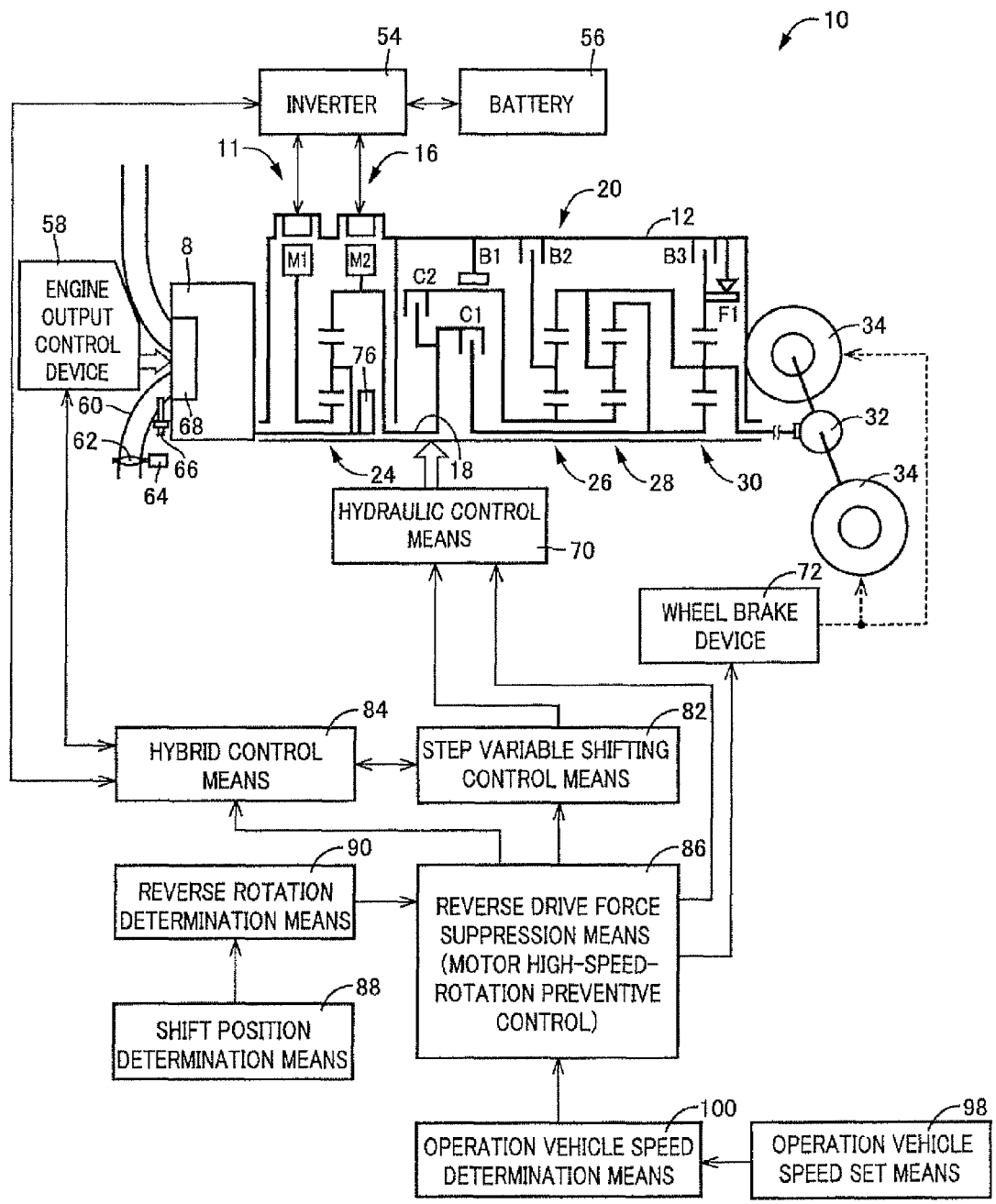
FIG. 13 is a functional block diagram illustrating major control functions to be executed by the electronic control unit of FIG. 4 in another embodiment, corresponding to the functional block diagrams shown in FIGS. 7 and 11.

FIG. 13 is a functional block diagram illustrating major control functions to be executed by an electronic control unit 80 in another embodiment corresponding to the embodiments shown in FIGS. 7 and 11. The present embodiment differs from the embodiments, shown in FIGS. 7 and 11, in that the reverse drive force suppression means 86 executes, in addition to the function described above, the motor high-speed-rotation preventive control. The motor high-speed-rotation preventive control serves to prevent the output member of the automatic transmission portion 20 from inputting a reverse drive force to the differential portion 11 when the output member of the automatic transmission portion 20 reaches a given rotation speed.

The given rotation speed, described above, represents a rotation speed of the output member of the automatic transmission portion 20 causing the first electric-motor rotation speed $N_{M1}$ to reach the high-speed rotation when the rotational direction of the drive wheels 34 becomes opposite to the rotational direction of the same with the running position selected by the shift operation device 50. In this sense, the given rotation speed represents preventive control commencement rotation speed (operation rotation speed) that is preliminarily determined on experiments for executing the motor high-speed-rotation preventive control.

Hereunder, detailed description is made on how the preventive control commencement rotation speed is set with reference to an exemplary case of a preventive control commencement vehicle speed (operation vehicle speed) $V_{TH}$ corresponding to the vehicle speed V. Of course, the preventive control commencement vehicle speed $V_{TH}$ is one example of the preventive control commencement rotation speed, which may include various kinds of preventive control commencement rotation speeds corresponding to the rotation speeds of the output member of the automatic transmission portion 20. For instance, the preventive control commencement rotation speed may include a preventive control commencement output-shaft rotation speed (operation output-shaft rotation speed) $N_{OUTTH}$ corresponding to the output-shaft rotation speed $N_{OUT}$.

For instance, the first electric-motor rotation speed $N_{M1}$ increases such that the greater the speed ratio γ of the automatic transmission portion 20, the higher will be the reverse rotation speed (rotation speed in negative phase) of the power transmitting member 18. Therefore, an ease of performing the motor high-speed-rotation preventive control can be altered depending on the speed ratio γ of the automatic transmission portion 20.

Figure 14:
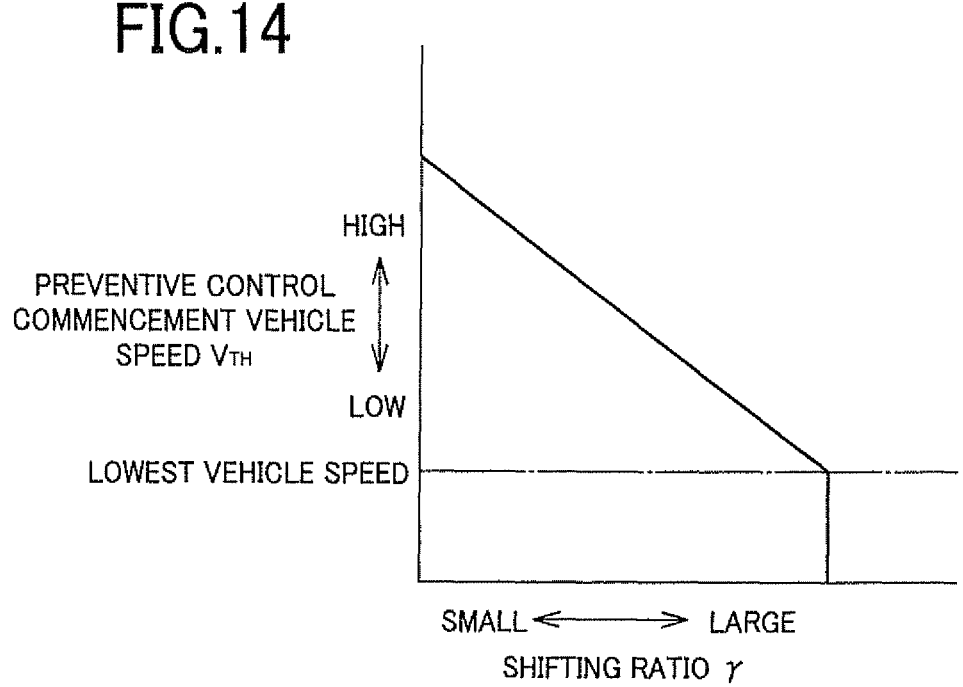
FIG. 14 is a view showing one example of a preventive control commencement vehicle speed map for use in setting a preventive control commencement vehicle speed based on a speed ratio of an automatic transmission portion.

In FIG. 13, operation vehicle speed set means 98 alters the preventive control commencement vehicle speed $V_{TH}$ depending on the speed ratio γ of the automatic transmission portion 20. For instance, the operation vehicle speed set means 98 sets (alters) the preventive control commencement vehicle speed $V_{TH}$ such that the greater the speed ratio of the automatic transmission portion 20, the lower will be the preventive control commencement vehicle speed $V_{TH}$. FIG. 14 shows a preventive control commencement vehicle speed map A that is preliminarily obtained and set on experiments such that the greater the speed ratio γ of the automatic transmission portion 20, the lower will be the preventive control commencement vehicle speed $V_{TH}$. By utilizing the preventive control commencement vehicle speed map A, the operation vehicle speed set means 98 sets the preventive control commencement vehicle speed $V_{TH}$ based on the speed ratio γ corresponding to an actual gear position of the automatic transmission portion 20.

For instance, even at the same vehicle speed V, the first electric-motor rotation speed $N_{M1}$ increases with an increase in the engine rotation speed $N_E$ due to the reverse rotation of the power transmitting member 18. Thus, the ease of performing the operation in the motor high-speed-rotation preventive control is altered depending on the engine rotation speed $N_E$.

Figure 15:
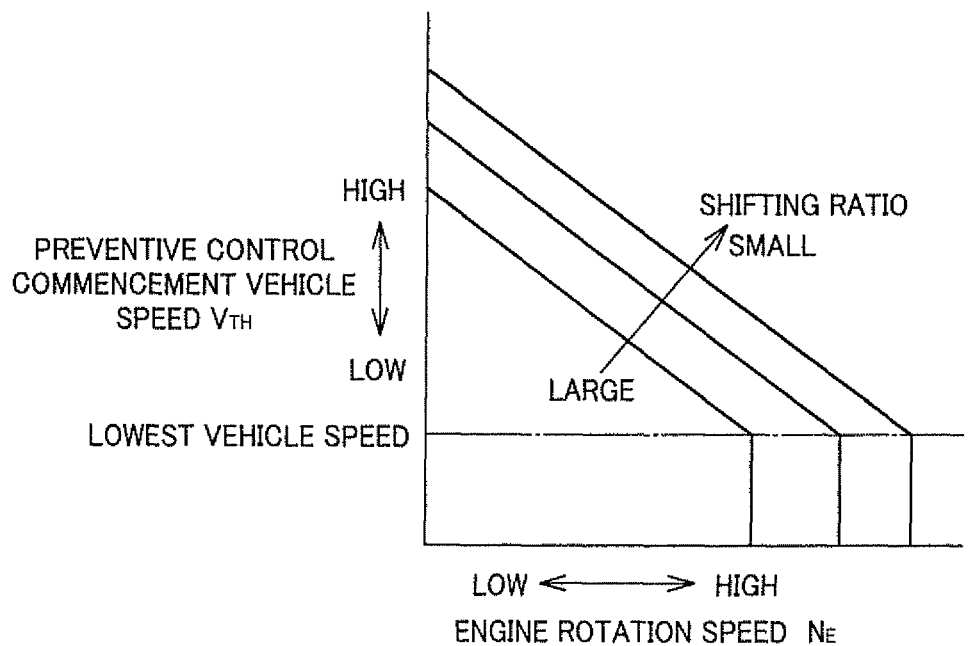
FIG. 15 is a view showing one example of a preventive control commencement vehicle speed map for use in setting a preventive control commencement vehicle speed based on an engine rotation speed and the speed ratio of the automatic transmission portion.

The operation vehicle speed set means 98 performs a function, in place of the function set forth above or in addition thereto, to alter the preventive control commencement vehicle speed $V_{TH}$ depending on the engine rotation speed $N_E$. For instance, FIG. 15 shows a preventive control commencement vehicle speed map B that is preliminarily obtained and set on experiments as a parameter including the speed ratio γ of the automatic transmission portion 20 such that the higher the engine rotation speed $N_E$, the lower will be the preventive control commencement vehicle speed $V_{TH}$. By utilizing the preventive control commencement vehicle speed map B, the operation vehicle speed set means 98 sets the preventive control commencement vehicle speed $V_{TH}$ based on the engine rotation speed $N_E$ and the speed ratio γ corresponding to an actual gear position of the automatic transmission portion 20.

Operation vehicle speed determination means 100 determines whether or not the actual vehicle speed V exceeds the preventive control commencement vehicle speed $V_{TH}$ set by the operation vehicle speed set means 98.

The reverse drive force suppression means 86 executes the motor high-speed-rotation preventive control as described below. That is, such a control is executed when the reverse rotation determining means 90 determines that the rotational direction of the drive wheels 34 becomes opposite to the rotational direction of the same with the current running position being set and the operation vehicle speed determination means 100 determines that the actual vehicle speed V exceeds the preventive control commencement vehicle speed $V_{TH}$.

Figure 16:
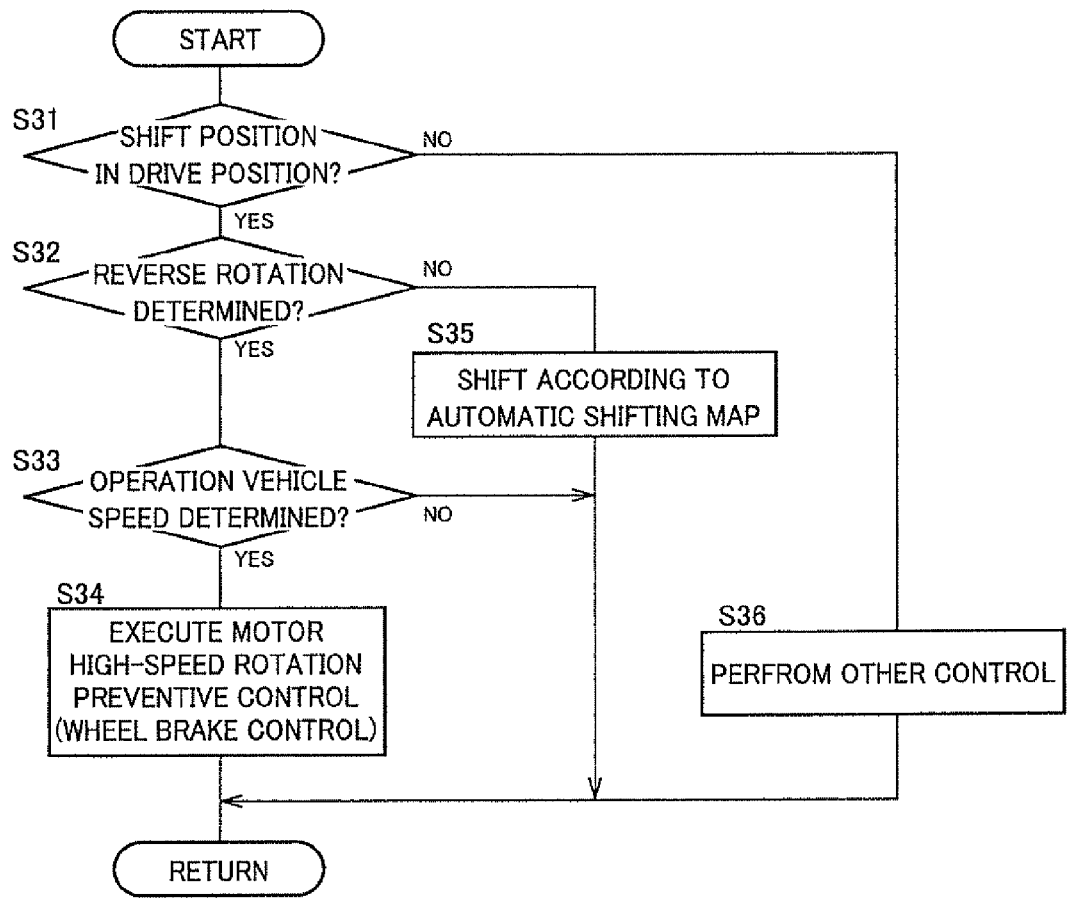
FIG. 16 is a flowchart illustrating a basic sequence of control operations to be executed by the electronic control unit shown in FIG. 4, that is, a basic sequence of control operations, executed for suppressing the high-speed rotation of the first electric-motor, even if the rotational direction of the drive wheels becomes opposite to the rotational direction of the same with the shift position being set to the running position. It represents another embodiment corresponding to the functional block diagrams shown in FIGS. 10 and 12.

FIG. 16 is a flowchart showing a basic sequence of major control operations to be executed by the electronic control unit 80, that is, a basic sequence of control operations for preventing the first electric motor M1 from rotating at a high speed even when the rotational direction of the drive wheels 34 becomes opposite to the rotational direction of the same with the shift position being set to the running position. Such a sequence is repeatedly executed on an extremely short cycle in the order of, for instance, several milliseconds or several tens milliseconds. The flowchart shown in FIG. 16 represents another embodiment corresponding to the embodiments shown in FIGS. 10 and 12.

In FIG. 16, first, in step S31 corresponding to the shift position determining means 88, a current shift position of the shift lever 52 is determined in response to a signal representing the shift position $P_{SH}$ thereof. That is, the operation is executed whether or not the shift position selected in the shift lever 52 lies in the running position such as the "D" position or "R" position, that is, whether or not the current shift position lies in the drive position.

If the determination in S31 is made negative, then, in S36, other controls than those executed in S32 to S35 described below are executed or the current routine is terminated.

If the determination in S31 is made positive, then, in S32 corresponding to the reverse rotation determination means 90, the operation is executed to determine whether or not the rotational, direction of the drive wheels 34 becomes opposite to the rotation direction of the same with the current running position being set.

If the determination in S32 is made negative, then, in S35 corresponding to the step-variable shift control means 82 and hybrid control means 84, the vehicle is rendered operative to normally run for the current running position.

If the determination in S32 is made positive, then, in S33 corresponding to the operation vehicle speed determination means 100, the operation is executed to determine whether or not the actual vehicle speed V exceeds the preventive control commencement vehicle speed $V_{TH}$ that is set based on the engine rotation speed $N_E$ and/or an actual speed ratio γ of the automatic transmission portion 20.

If the determination in S33 is made negative, then, the current routine is terminated. If the determination in S33 is made positive, then, in S34 corresponding to the reverse drive force suppression means 86 (rotation interruption means 94), the motor high-speed-rotation preventive control is executed. For instance, the output-member reverse-rotation preventive control and power-transmitting path interruptive control may be executed singly or in combination. In performing the output-member reverse-rotation preventive control, the automatic transmission portion 20 is rendered inoperative in a locked state or the wheel brake device of the vehicle is actuated, thereby halting the rotations of the output member of the automatic transmission portion 20.

In performing the power-transmitting path interruptive control, the hydraulic control circuit 70 interrupts the supply of hydraulic pressure to the clutches C1, C2 or stops the operation of the hydraulic pressure source, thereby interrupting the rotation transfer from the output member of the automatic transmission portion 20 to the power transmitting member 18. Thus, no reverse rotation of the power transmitting member 18 takes place, thereby avoiding the first electric motor M1 from rotating at a high speed.

As set forth above, the third illustrated embodiment has, in addition to the functions of the embodiments mentioned above, further additional functions as described below. Under a circumstance where the rotational direction of the drive wheels 34 becomes opposite to the rotational direction of the same with the shift position being set to the running position and the vehicle speed V exceeds the preventive control commencement vehicle speed $V_{TH}$, the reverse drive force suppression means 86 prevents a reverse drive force from being input from the output member of the automatic transmission portion 20 to the differential portion 11. This prevents the control of suppressing the output member of the automatic transmission portion 20 from inputting the reverse drive force to the differential portion 11, that is, the motor high-speed-rotation preventive control from being executed to a degree more than necessary.

In the third illustrated embodiment, the preventive control commencement rotation speed (operation rotation speed) is altered based on the speed ratio γ of the automatic transmission portion 20. That is, the ease of the reverse drive force suppression means 86 for initiating the motor high-speed-rotation preventive control can be altered according to the situation where even at the same vehicle speed V, as the speed ratio γ of the automatic transmission portion 20 increases, the reverse rotation speed (rotation speed in a negative phase) of the power transmitting member 18 increases with a resultant increase in the first electric-motor rotation speed $N_{M1}$.

In the third illustrated embodiment, the preventive control commencement rotation speed (operation rotation speed) is set (altered) such that the greater the speed ratio γ of the automatic transmission portion 20, the lower will be the preventive control commencement rotation speed. Accordingly, the reverse drive force suppression means 86 can easily perform the motor high-speed-rotation preventive control as the speed ratio γ of the automatic transmission portion 20 increases with an increase induced in the first electric-motor rotation speed $N_{M1}$.

In the third illustrated embodiment, the preventive control commencement rotation speed (operation rotation speed) is altered based on the actual engine rotation speed $N_E$. This can alter the ease of the reverse drive force suppression means 86 for initiating the motor high-speed-rotation preventive control according to the situation where even at the same vehicle speed V, the engine rotation speed $N_E$ increases and the first electric-motor rotation speed $N_{M1}$ increases due to the reverse rotation of the power transmitting member 18.

In the third illustrated embodiment, the preventive control commencement rotation speed (operation rotation speed) is set (altered) such that the higher the engine rotation speed $N_E$, the lower will be the preventive control commencement rotation speed. Accordingly, this enables the reverse drive force suppression means 86 to easily initiate the motor high-speed-rotation preventive control as the engine rotation speed $N_E$ increases to a high level with a consequence of the first electric-motor rotation speed $N_{M1}$ increasing at a relatively high level.

Fourth Embodiment

Figure 17:
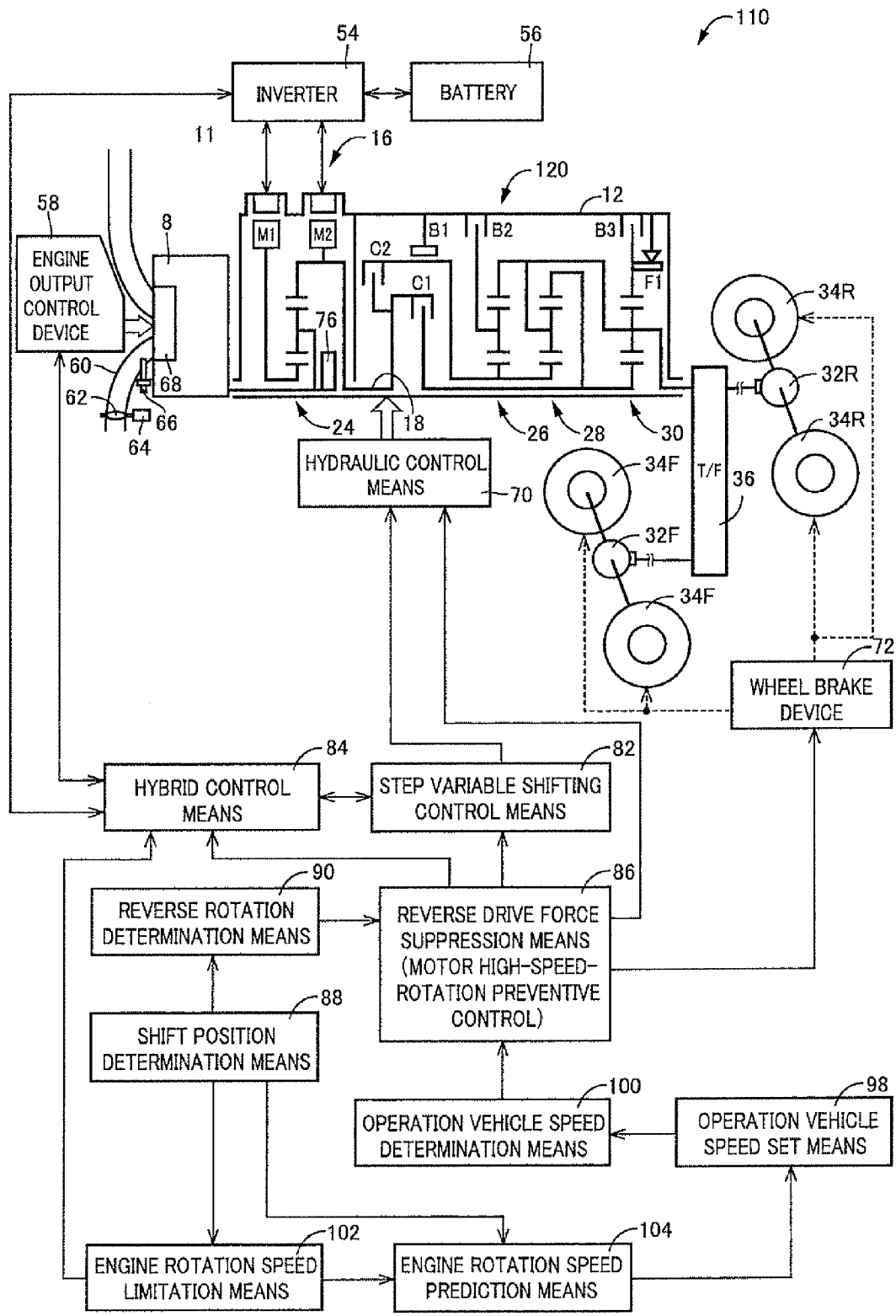
FIG. 17 is a functional block diagram illustrating major control operations to be executed by the electronic control unit shown in FIG. 4 in another embodiment, corresponding to the functional block diagrams shown in FIGS. 7, 11 and 13.

FIG. 17 is a functional block diagram for illustrating major control functions to be executed by an electronic control unit 80 in another embodiment corresponding to the embodiments shown in FIGS. 7, 11 and 13. The present embodiment differs from the embodiments, shown in FIGS. 7, 11 and 13, in that engine rotation speed limitation means 102 is provided for limiting the engine rotation speed $N_E$ at a further increasing rate, when the speed ratio γ of the automatic transmission portion 20 remains at a high level, than that when it remains at a low level. This is because even if the rotational direction of the drive wheels 34 becomes opposite to the rotational direction of the same with the running position selected with the shift operation device 50, the first electric-motor rotation speed $N_{M1}$ can be prevented from rotating at a high speed due to the reverse rotation of the power transmitting member 18 that increases with an increase in the speed ratio γ of the automatic transmission portion 20.

The engine rotation speed limitation means 102 sets an upper limit of a target engine rotation speed $N_E$ to be limited and outputs a command to the hybrid control means 84 for controlling the engine 8 so as to achieve such a target engine rotation speed $N_E$. Upon receipt of such a command, the hybrid control means 84 outputs a command to the engine output control means 58 for executing, for instance, the throttle control, fuel injection control and ignition timing control singly or in combination of these controls, With the present embodiment, an automatic transmission portion 120 includes a transfer 36, acting as a fore and aft wheel drive force distributing device, which is disposed in the power transmitting path between the output shaft 22 and the drive wheels 34 (including rear wheels 34R and front wheels 34R). Accordingly, a transmission mechanism 110, preferably usable in a 4WD type vehicle, allows drive power of the engine 8 to be transmitted to the output shaft 22 through which drive power is transmitted through a rear differential gear device 32R and a pair of vehicle axles to a pair of drive wheels 34 in sequence. Meanwhile, drive power is distributed from the output shaft 22 via the transfer 36 and transmitted to a pair of front wheels 34F via a front differential gear device 32F and a pair of vehicle axles in sequence. The transfer 36 may include a subsidiary transmission, available to be shifted in gear positions in, for instance, two large and small (low and high) stages, which can be changed over to one of low and high states with a user operating a changeover switch.

As set forth above, as the engine rotation speed $N_E$ decreases, the first electric-motor rotation speed $N_{M1}$ is less liable to reach a high-rotation speed. Accordingly, when the transfer 36 is changed over to the gear position on the low side with a large speed ratio, the engine rotation speed limitation means 102 limits the engine rotation speed $N_E$ in contrast to a case where the transfer 36 is changed over to the gear position on the high side with a low speed ratio. That is, when the transfer 36 remains in the low state, the engine rotation speed limitation means 102 sets the upper limit of the target engine rotation speed $N_E$ to a lower level than that is set for such an upper limit when the transfer 36 remains in the high state.

The engine rotation speed limitation means 102 limits (decreases) the engine rotation speed $N_E$ for the purpose of suppressing the first electric motor M1 from rotating at a high speed. Accordingly, such a limitation is executed when the shift lever 52 is shifted from the "N" or "P" position to the "D" or "R" position with the power transmitting path of the automatic transmission portion 120 shifted from a power cut-off state to a power transmitting state. When this takes place, there is a limited response in a drop of the engine rotation speed $N_E$. Therefore, at a time when the power transmitting path of the automatic transmission portion 120 is placed in the power transmitting state, there is a likelihood that the engine rotation speed $N_E$ does not necessarily reach the target engine rotation speed $N_E$.

To address such a likelihood, the present embodiment contemplates the provision of an engine rotation speed prediction means operative to predict an achievable engine rotation speed $N_E$ when the engine rotation speed limitation means 102 limits the engine rotation speed $N_E$.

With the engine rotation speed limitation means 102 limited the engine rotation speed $N_E$, the operation vehicle speed set means 98 performs a function, in addition to the function mentioned above, to set (alter) the preventive control commencement vehicle speed $V_{TH}$. Such setting (alteration) is executed based on the engine rotation speed $N_{EF}$ (herein referred to as a "predicted engine rotation speed"), predicted by the engine rotation speed prediction means 104, and the speed ratio γ corresponding to an actual gear position of the automatic transmission portion 20 by referring to the preventive control commencement vehicle speed map B as shown in FIG. 15.

More particularly, the shift position determination means 88 determines whether or not the shift position of the shift lever 52 is switched from the non-running position to the running position, for instance, whether or not the shift position is switched from the "N" position to the "D" position or "R" position, or whether or not the shift position is switched from the "P" position to the "R" position.

Sometimes the engine rotation speed limitation means 102 limits the engine rotation speed $N_E$. When this takes place, the engine rotation speed prediction means 104 predicts the achievable engine rotation speed $N_{EF}$ at a time when the shift position is switched to the running position accompanied by the beginning of the coupling engagement of the coupling device (such as, for instance, the first clutch) to cause the power transmitting path of the automatic transmission portion 20 to be placed in the power transmitting state. That is, the engine rotation speed prediction means 104 predicts a probability of a decrease in the engine rotation speed $N_E$. During such operation, the prediction is executed originating a starting point when the shift position determination means 88 determines that the shift position of the shift lever 52 is switched from the non-running position to the running position.

Figure 18:
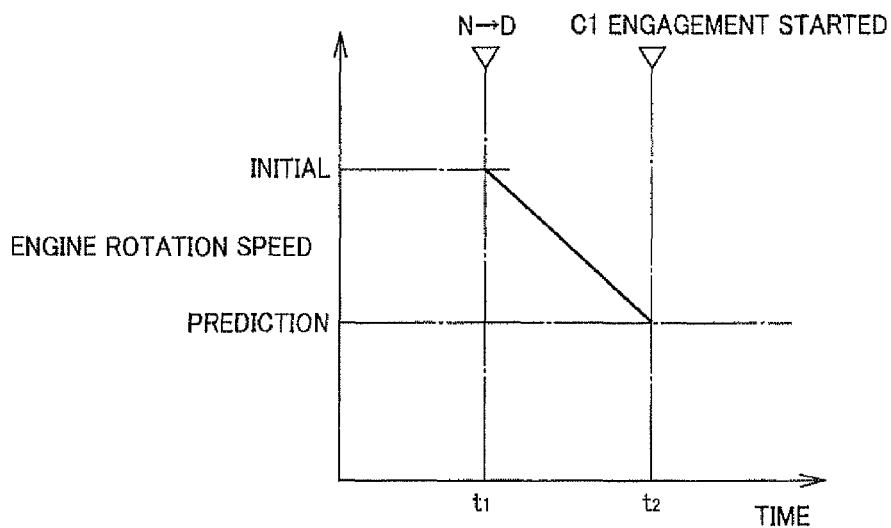
FIG. 18 is a view showing a variation in engine rotation speed during a period from a time at which the shift position is shifted from an "N" position to a "D" position to a time at which a first clutch C1 begins to be coupled to place a power transmitting path of an automatic transmission portion in a power transmitting state.

FIG. 18 represents one example illustrating a variation in engine rotation speed $N_E$ from a time point (a time t1) at which the shift position is switched from the "N" position to the "D" position to a time point (a time t2) at which the first clutch C1 is coupled to allow the automatic transmission portion 20 to have the power transmitting path placed in the power transmitting state. The time t2 represents a time point at which the clutch C1 starts to have a torque capacity. As will be apparent from FIG. 18, the engine rotation speed $N_E$ is limited (decreased) from a default value set to the engine rotation speed $N_E$ at the time point t1. Thus, as the default value is set to a high level, the predicted engine rotation speed $N_{EF}$ increases at the time point t2.

Figure 19:
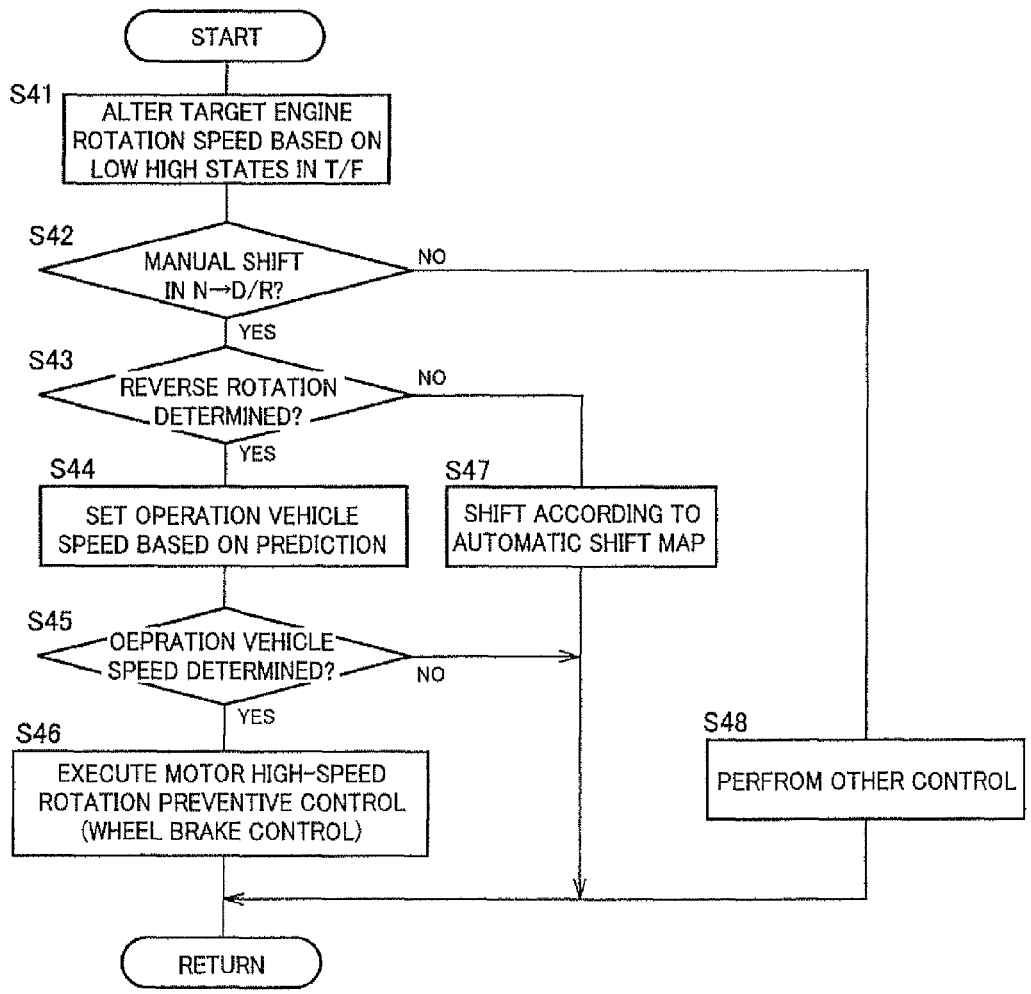
FIG. 19 is a flowchart illustrating a basic sequence of control operations to be executed by the electronic control unit shown in FIG. 4, that is, a basic sequence of control operations, executed for suppressing the high-speed rotation of the first electric-motor even if the rotational direction of drive wheels becomes opposite to the rotational direction of the same with the shift position being set to the running position. It represents another embodiment, corresponding to the functional block diagrams shown in FIGS. 10, 12 and 16.

FIG. 19 is a flowchart showing a basic sequence of major control operations to be executed by the electronic control unit 80, that is, a basic sequence of control operations for preventing the first electric motor M1 from rotating at a high speed even when the rotational direction of the drive wheels 34 becomes opposite to the rotational direction of the same with the shift position being set to the running position. Such a sequence is repeatedly executed on an extremely short cycle in the order of, for instance, several milliseconds or several tens milliseconds. The flowchart shown in FIG. 19 represents another embodiment corresponding to the embodiments shown in FIGS. 10, 12 and 16.

In FIG. 19, first, in step S41 corresponding to the engine rotation speed limitation means 102, the upper limit of the engine rotation speed $N_E$ is forcibly limited according to the low and high states of the transfer 36. That is, the operation is executed to set the upper limit of the target the engine rotation speed $N_E$ to be limited depending on the low and high states of the transfer 36. For instance, the low and high states of the transfer 36 is decided in response to the user's operation to set the changeover switch for switching the low and high states or actual low and high states of the transfer 36 are detected.

Next, in S42 corresponding to the shift position determination means 88, the operation is executed to determine whether or not the shift position of the shift lever 52 is switched from the non-running position to the running position. For instance, the shift position determination means 88 determines whether or not the shift position of the shift lever 52 is switched from the "N" position to the "D" position or the "R" position.

If the determination in S42 is made negative, then, in S48, other controls than those executed in 543 to S47 described below are executed or the current routine is terminated.

If the determination in S42 is made positive, then, in S43 corresponding to the reverse rotation determination means 90, the operation is executed to determine whether or not the rotational direction of the drive wheels 34 is opposite to the rotational direction of the same with the current running position.

If the determination in 543 is made negative, then, in S47 corresponding to the step-variable shift control means 82 and hybrid control means 84, the vehicle is rendered operative to normally run for the current running position.

If the determination in S43 is made positive, then, in S44 corresponding to the operation vehicle speed set means 98, by using the preventive control commencement vehicle speed map B, for instance, as shown in FIG. 15, the predicted engine rotation speed $N_{EF}$ and preventive control commencement vehicle speed $V_{TH}$ are set with an origin on the time point when the determination in S42 is made positive. The predicted engine rotation speed $N_{EF}$ represents a rotation speed that can be achieved at a time point when the shift lever is switched to the running position accompanied by the coupling engagement of the first clutch C1 when the engine rotation speed $N_E$ is limited. The preventive control commencement vehicle speed $V_{TH}$ is set depending on the predicted engine rotation speed $N_{EF}$ and the speed ratio γ of the automatic transmission portion 20 at a value corresponding to an actual gear position thereof.

In succeeding step S45 corresponding to the operation vehicle speed determination means 100, the operation is executed to determine whether or not the actual vehicle speed V exceeds the preventive control commencement vehicle speed $V_{TH}$ that has been set in S44.

If the determination in S45 is made negative, then, the current routine is terminated. If the determination in S45 is made positive, then, in S46 corresponding to the reverse drive force suppression means 86 (motor high-speed-rotation preventive control means), the motor high-speed-rotation preventive control is executed. For instance, the output-member reverse-rotation preventive control and power-transmitting path interruptive control may be executed singly or in combination.

The output-member side reverse-rotation preventive control allows the automatic transmission portion 20 to be rendered inoperative in a locked state or the wheel brake device of the vehicle to be actuated, thereby halting the rotation of the output member of the automatic transmission portion 20. The power-transmitting path interruptive control allows the hydraulic control circuit 70 to interrupt the supply of hydraulic pressure to the clutches C1, C2 or the hydraulic pressure source to be stopped in operation. This interrupts the rotation transfer from the output member of the automatic transmission portion 20 to the power transmitting member 18. Thus, no reverse rotation of the power transmitting member 18 takes place, thereby avoiding the first electric motor M1 from rotating at a high speed.

In the fourth illustrated embodiment, as set forth above, the engine rotation speed limitation means 102 limits the engine rotation speed $N_E$ when the speed ratio γ of the automatic transmission portion 20 lies at the high level in contrast to a case where the speed ratio γ of the automatic transmission portion 20 lies at the low level. Accordingly, even if the rotational direction of the drive wheels 34 becomes opposite to the rotational direction of the same with the current running position selected by the shift operation device 450, the first electric-motor rotation speed $N_{M1}$ can be suppressed from increasing to a high level due to the reverse rotation of the power transmitting member 18 that increases in speed with an increase in the speed ratio γ of the automatic transmission portion 20. This results in improved durability of the first electric motor M1.

In the fourth illustrated embodiment, the engine rotation speed limitation means 102 limits the engine rotation speed $N_E$ when the transfer 36 is shifted in the gear position under the low state with the large speed ratio in contrast to a case where the transfer 36 is shifted in the gear position under the high state with the small speed ratio. Accordingly, this properly prevents the first electric-motor rotation speed $N_{M1}$ from rotating at a high speed.

In the fourth illustrated embodiment, the preventive control commencement rotation speed (operation rotation speed) is altered based on the predicted engine rotation speed $N_{EF}$. Accordingly, under a circumstance where, for instance, the engine rotation speed $N_E$ is caused to decrease toward the target predicted engine rotation speed $N_{EF}$ for the purpose of suppressing the first electric motor M1 from rotating at the high speed, the ease of the reverse drive force suppression means 86 for performing the motor high speed rotation preventive control can be altered according to the achievable predicted engine rotation speed $N_{EF}$ in connection with the response.

In the fourth illustrated embodiment, during the operation of the engine rotation speed limitation means 102 for limiting the engine rotation speed $N_E$, the achievable predicted engine rotation speed $N_{EF}$ is obtained at a time point when the power transmitting path of the automatic transmission portion 120 is placed in the power transmitting state. When this takes place, such an operation originates at a time point when the shift position determination means 88 determines that the shift position of the shift lever 52 is switched from the non-running position to the running position. In addition, the time point at which the power transmitting path is placed in the power transmitting state depends on a commencement at which the engine rotation speed prediction means 104 allows the shift position to be switched to the running position with the coupling device (such as, for instance, the first clutch C1) being brought into coupling engagement. Accordingly, the preventive control commencement rotation speed (operation rotation speed) is properly altered based on the predicted engine rotation speed $N_{EF}$ when the power transmitting member 18 is actually involved in the reverse rotation.

While the present invention has been described above in detail with reference to the first to fourth embodiments shown in the accompanying drawings, the present invention may be implemented in combination of these various embodiments described above and may be applied in other modes.

In the illustrated embodiments set forth above, for instance, the engine rotation speed limitation means 102 limits the engine rotation speed $N_E$ in accordance with the low and high states of the transfer 36. However, the engine rotation speed $N_E$ may be further limited, depending on the speed ratio γ of the automatic transmission portion 120, when the speed ratio γ lies at a high level in contrast to a case where when the speed ratio γ lies at a low level. Such a limited engine rotation speed $N_E$ prevents the first electric-motor rotation speed $N_{M1}$ from rotating at a high speed.

In the illustrated embodiments set forth above, placing the automatic transmission portion 20 in the locked state or actuating the wheel brake device of the vehicle allows the motor high speed rotation preventive control to be executed singly or in combination of the output-member reverse-rotation preventive control for halting the rotation of the output member of the automatic transmission portion 20 and the power-transmitting path interruptive control for interrupting the rotation transfer to the power transmitting member 18. In addition, the power-transmitting path interruptive control allows the hydraulic control circuit 70 to interrupt the supply of hydraulic pressure to the clutches C1, C2 or to stop the operation of the hydraulic pressure source for thereby interrupting the output member of the automatic transmission portion 20 from performing the rotation transfer to the power transmitting member 18.

Moreover, the motor high speed rotation preventive control may be executed in various modes. In one mode, for instance, the wheel brake device of the vehicle may be actuated at a higher vehicle speed than that at which the wheel brake device of the vehicle is actuated with the automatic transmission portion 20 placed in the locked state. In another mode, for instance, the operation of the hydraulic pressure source may be stopped at a higher vehicle speed than that at which the operation of the hydraulic pressure source is stopped when the hydraulic pressure control circuit 70 interrupts the supply of hydraulic pressure to the clutches C1, C2.

In the illustrated embodiments set forth above, the differential portion 11 (power distributing mechanism 16) is structured to function as the electrically controlled continuously variable transmission with the gear ratio γ0 continuously varied from the minimal value of γ0 min to the maximal value of γ0 max. However, the present invention may be applied in a mode wherein, for instance, the speed ratio γ0 is not continuously varied in the differential portion 11 but is dared to vary the speed ratio γ0 step-by-step with the use of the differential action.

In the illustrated embodiments set forth above, the differential portion 11 may suffice to include a differential limitation device provided in the power distributing mechanism 16 to limit the differential action to be actuated as a step variable transmission of at least forward-drive two stages. The present invention may be applied in a case where the differential limitation device does not exclusively limit the differential action of the differential portion 11 (power distributing mechanism 16).

With the power distributing mechanisms 16 of the illustrated embodiments, the first carrier CA1 is connected to the engine 8; the first sun gear S1 is connected to the first electric motor M1; and the first ring gear R1 is connected to the power transmitting member 18. However, the present invention is not limited to such connecting arrangement. The engine 8, first electric motor M1 and transmitting member 18 may suffice to be connected to either ones of the three elements CA1, S1 and R1 of the first planetary gear unit 24.

Although the engine 8 is directly connected to the input shaft 14 in the illustrated embodiments, the engine 8 may be connected to the input shaft 14 through gears, a belt or the like, and no need arises for these component elements to be disposed on a common axis.

In the illustrated embodiments, the first electric motor M1 and the second electric motor M2 are disposed coaxially with the input shaft 14; the first electric motor M1 is connected to the first sun gear S1; and the second electric motor M2 is connected to the power transmitting member 18. However, such arrangement is not essential. For example, the first electric motor M1 may be connected to the first sun gear S1 through gears, a belt or the like, and the second electric motor M2 may be connected to the power transmitting member 18.

The hydraulic-type frictional coupling devices, such as the switching clutch C0 and switching brake B0, may be of a coupling device of a magnetic-powder type, an electromagnetic type or a mechanical type, such as a powder (magnetic powder) clutch, an electromagnetic clutch and a meshing type dog clutch. With the hydraulic-type frictional coupling device composed of, for instance, the magnetic clutch, the hydraulic control circuit 70 may not include valve devices for switching oil passages but may include a switching devices or electromagnetic switching devices or the like for switching electric command signal circuits associated with electromagnetic clutches.

In the illustrated embodiments, the automatic transmission portion 20, 120 is disposed in the power transmitting path between the power transmitting member 18, serving as the output member of the differential portion 11, i.e., the power distributing mechanism 16, and the drive wheels 38. However, the automatic transmission portion 20, 120 has no need to necessarily include the one-way clutch F1. With a structure in the absence of the one-way clutch F1, for instance, the automatic transmission portion 20 is placed in the locked state upon coupling at least two of the brakes B1 to B3, or coupling, the clutches C1, C2 and at least one of the brakes B1 to B3.

In place of the automatic transmission portion 20, 120, a transmission portion (power transmission) of the other type may be employed. For instance, such a transmission portion may include a continuously variable transmission (CVT) that is a kind of an automatic transmission portion or an automatic transmission portion, comprised of a manual transmission well known as a constant-mesh parallel two-shaft transmission, which can automatically shift gear positions with the use of select cylinders and shift cylinders. In such a way, the present invention may be applied.

In the illustrated embodiments, furthermore, the automatic transmission portion 20, 120 is connected to the differential portion 11 in series via the power transmitting member 18. However, a countershaft may be provided in parallel to the input shaft 14 to allow the automatic transmission portion 20, 72 to be concentrically disposed on the countershaft. In this case, the differential portion 11 and the automatic transmission portion 20, 120 are connected to each other in power transmitting capability via a counter-gear pair acting as the power transmitting member 18 or a set of transmitting members such as, for instance, a sprocket and a chain.

In the illustrated embodiments, the power distributing mechanism 16 may include a differential gear set having a pair of bevel gears, held in meshing engagement with a pinion rotatably driven with an engine, which are operatively connected to the first electric motor M1 and the power transmitting member 18 (the second electric motor M2).

In the illustrated embodiments, the power distributing mechanism 16 is comprised of one set of planetary gear units. However, the power distributing mechanism 16 may be comprised of two or more planetary gear units that is placed in a non-differential state (fixed speed state) to function as a transmission having three or more speed gear positions. In addition, the planetary gear unit is not limited to the single-pinion type, but may be of a double-pinion type.

The shift operation device 50 of the illustrated embodiments has the shift lever 52 that can be manipulated for selecting one of a plurality of shift positions $P_{SH}$. However, instead of such a shift lever 52, a switch or device may be employed as described below. For instance, these elements may include a switch such as, for instance, a push-button type switch or a sliding type switch or the like for selecting one of a plurality of shift positions $P_{SH}$, a device for selecting one of a plurality of shift positions $P_{SH}$ in response to a driver's voice without relying on a manual operation of the driver, and a device available to be operated by a foot for selecting one of a plurality of shift positions $P_{SH}$.

In the illustrated embodiments set forth above, with the shift lever 52 operated in an "M" position, a shift range is set. However, gear positions may be set, i.e., maximal gear positions on various ranges may be set as the gear positions. In this case, with the automatic transmission portion 20, 120, the gear positions are switched for executing a shifting action. For example, with the shift lever 92 manually operated to an upshift position "+" and a downshift position "−" in the "M" position, any one of a 1st-speed gear position to a 4th-speed gear position may be set depending on a manipulated position of the shift lever 52.

Moreover, it is to be appreciated that the illustrated embodiments disclosed are meant to be illustrative only and that the present invention can be implemented in various modes in modification or improvement.

What is claimed is:

1. A control device for a vehicular drive system,
   the vehicular drive system including an electric differential portion having a first element connected to an engine, a second element connected to a first electric-motor and a third element connected to a power transmitting member for distributing an output of the engine to the first electric-motor and the power transmitting member, and a transmission portion disposed in a power transmitting path between the power transmitting member and drive wheels; and
   the control device being comprised of engine rotation speed limitation means for limiting an engine rotation speed when a speed ratio of the transmission portion is high in contrast to case where the speed ratio of the transmission portion is low.

2. The control device for a vehicular drive system according to claim 1, wherein:
   the transmission portion has a subsidiary transmission provided with switchable gear positions in large and small two stages; and
   the engine rotation speed limitation means limits the engine rotation speed when the subsidiary transmission is shifted to a gear position with a high speed ratio in contrast to case where the subsidiary transmission is shifted to another gear position with a low speed ratio.

* * * * *